United States Patent
Sasaki

(10) Patent No.: US 9,882,216 B2
(45) Date of Patent: Jan. 30, 2018

(54) BINDER COMPOSITION FOR LITHIUM ION SECONDARY BATTERY ELECTRODES, SLURRY COMPOSITION FOR LITHIUM ION SECONDARY BATTERY ELECTRODES, ELECTRODE FOR LITHIUM ION SECONDARY BATTERIES, AND LITHIUM ION SECONDARY BATTERY

(71) Applicant: ZEON CORPORATION, Tokyo (JP)

(72) Inventor: Tomokazu Sasaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/892,967

(22) PCT Filed: Jun. 3, 2014

(86) PCT No.: PCT/JP2014/064786
§ 371 (c)(1),
(2) Date: Nov. 20, 2015

(87) PCT Pub. No.: WO2014/196547
PCT Pub. Date: Dec. 11, 2014

(65) Prior Publication Data
US 2016/0126551 A1   May 5, 2016

(30) Foreign Application Priority Data
Jun. 4, 2013 (JP) ................. 2013-118022

(51) Int. Cl.
*H01M 4/62* (2006.01)
*H01M 4/13* (2010.01)
*H01M 10/0525* (2010.01)

(52) U.S. Cl.
CPC ............. *H01M 4/62* (2013.01); *H01M 4/13* (2013.01); *H01M 4/622* (2013.01); *H01M 10/0525* (2013.01); *H01M 4/623* (2013.01); *H01M 2220/30* (2013.01)

(58) Field of Classification Search
CPC .... H01M 4/62; H01M 10/0525; H01M 4/622; H01M 4/13; H01M 4/623; H01M 2220/30; Y02E 60/122
See application file for complete search history.

(56) References Cited

U.S. PATENT DOCUMENTS

| 7,846,588 | B2 | 12/2010 | Jung et al. | |
|---|---|---|---|---|
| 2009/0239147 | A1* | 9/2009 | Itou | C08L 27/16 429/217 |
| 2011/0311870 | A1* | 12/2011 | Wakizaka | H01M 4/13 429/217 |
| 2014/0127571 | A1 | 5/2014 | Moroishi et al. | |
| 2014/0205904 | A1* | 7/2014 | Sasaki | H01M 4/622 429/217 |

FOREIGN PATENT DOCUMENTS

| JP | 2006-019274 A | | 1/2006 |
|---|---|---|---|
| JP | 2009-123523 A | | 6/2009 |
| JP | 2013-012357 A | | 1/2013 |
| JP | 5967098 | * | 7/2016 |
| WO | 2007/088979 A1 | | 8/2007 |
| WO | 2012/173072 A1 | | 12/2012 |
| WO | 2013031690 A1 | | 3/2013 |
| WO | 2013/062088 A1 | | 5/2013 |
| WO | WO2013062088 | * | 5/2013 |

OTHER PUBLICATIONS

JP 2010-146870MT.*
WO2013062088MT.*
Translation of the Written Opinion issued in Application No. PCT/JP2014/064786, dated Aug. 26, 2014.
International Search Report issued in Application No. PCT/JP2014/064786, dated Aug. 26, 2014.

* cited by examiner

*Primary Examiner* — Alex Usyatinsky
(74) *Attorney, Agent, or Firm* — Studebaker & Brackett PC

(57) ABSTRACT

A binder composition for a lithium ion secondary battery electrode, including a particulate polymer and a water-soluble polymer, wherein the water-soluble polymer includes an ethylenically unsaturated carboxylic acid monomer unit in an amount of 20% by weight to 85% by weight, a carboxylic acid amide monomer unit in an amount of 0.1% by weight to 10% by weight, and a crosslinkable monomer unit in an amount of 0.1% by weight to 2.0% by weight.

5 Claims, No Drawings

BINDER COMPOSITION FOR LITHIUM ION SECONDARY BATTERY ELECTRODES, SLURRY COMPOSITION FOR LITHIUM ION SECONDARY BATTERY ELECTRODES, ELECTRODE FOR LITHIUM ION SECONDARY BATTERIES, AND LITHIUM ION SECONDARY BATTERY

FIELD

The present invention relates to a binder composition for a lithium ion secondary battery electrode, as well as a slurry composition for a lithium ion secondary battery electrode, an electrode for a lithium ion secondary battery, and a lithium ion secondary battery using the binder composition for a lithium ion secondary battery electrode.

BACKGROUND

In recent years, mobile terminal devices such as notebook computers, cellular phones and personal digital assistants (PDAs) are increasingly widespread. As secondary batteries used as a power source for these mobile terminal devices, lithium ion secondary batteries are frequently used. Mobile terminal devices are rapidly made smaller, thinner, and lighter with higher performance. As a result, mobile terminal devices come to be utilized in a variety of occasions. Accordingly, secondary batteries are, similarly to mobile terminal devices, required to be made smaller, thinner and lighter with higher performance.

Aiming at enhancement of the performance of secondary batteries, improvement of electrodes, electrolytic solutions, and other battery members is being studied. Among these, the electrode is usually manufactured by obtaining a slurry composition by mixing an electrode active material with a liquid composition in which a polymer serving as a binder is dispersed or dissolved in a solvent, then applying this slurry composition onto a current collector, and drying the applied slurry composition. As to the electrode manufactured by such a method, there has been made an attempt to realize higher performance of secondary batteries by improvement of binders (see Patent Literatures 1 to 5).

CITATION LIST

Patent Literature

Patent Literature 1: Japanese Patent Application Laid-Open No. 2006-019274 A
Patent Literature 2: Japanese Patent Application Laid-Open No. 2009-123523 A
Patent Literature 3: Japanese Patent Application Laid-Open No. 2013-012357 A
Patent Literature 4: International Publication No. 2007/088979
Patent Literature 5: International Publication No. 2012/173072

SUMMARY

Technical Problem

In lithium ion secondary batteries, a gas is sometimes generated when in use. There are a variety of possible causes of such gas generation. Examples thereof may include halide ions in an electrolytic solution. When halide ions are contained in a battery, a gas may be generated by, e.g., decomposition of an electrolytic solution and decomposition of a solid electrolyte interphase (SEI) on the surface of the electrode.

When a gas is generated in a lithium ion secondary battery, cycle property of the lithium ion secondary battery deteriorate, and the battery life tends to be shortened. Therefore, there has been a demand for a technology that enables suppression of gas generation in a lithium ion secondary battery.

The present invention has been devised in view of the aforementioned problems. The object of the present invention is to provide: a binder composition for lithium ion secondary battery electrodes, a slurry composition for lithium ion secondary battery electrodes, and an electrode for lithium ion secondary batteries, with which it is possible to manufacture a lithium ion secondary battery that can suppress gas generation; and a lithium ion secondary battery that can suppress gas generation.

Solution to Problem

The present inventor have made extensive studies for solving the problems. As a result, the inventor has found out that gas generation can be suppressed by: using a combination of a particulate polymer and a water-soluble polymer as a binder of an electrode of a lithium ion secondary battery; and using, as the water-soluble polymer, a polymer containing a combination of an ethylenically unsaturated carboxylic acid monomer unit, a carboxylic acid amide monomer unit, and a crosslinkable monomer unit, at a specific ratio. Thus, the present invention has been completed.

That is, the present invention is as follows.

(1) A binder composition for a lithium ion secondary battery electrode, comprising a particulate polymer and a water-soluble polymer, wherein the water-soluble polymer includes an ethylenically unsaturated carboxylic acid monomer unit in an amount of 20% by weight to 85% by weight, a carboxylic acid amide monomer unit in an amount of 0.1% by weight to 10% by weight, and a crosslinkable monomer unit in an amount of 0.1% by weight to 2.0% by weight.

(2) The binder composition for a lithium ion secondary battery electrode according to (1), wherein a weight ratio between the particulate polymer and the water-soluble polymer is: particulate polymer/water-soluble polymer=99.0/1.0 to 50.0/50.0.

(3) The binder composition for a lithium ion secondary battery electrode according to (1) or (2), wherein the water-soluble polymer has a weight average molecular weight of 5,000 to 200,000.

(4) A slurry composition for a lithium ion secondary battery electrode, comprising: the binder composition for a lithium ion secondary battery electrode according to any one of (1) to (3); and an electrode active material.

(5) The slurry composition for lithium ion secondary battery electrodes according to (4), comprising a carboxymethyl cellulose salt.

(6) An electrode for a lithium ion secondary battery, comprising:
   a current collector; and
   an electrode active material layer obtained by applying, onto the current collector, the slurry composition for a lithium ion secondary battery electrode according to (4) or (5), and drying the slurry composition.

(7) A lithium ion secondary battery comprising a positive electrode, a negative electrode, and an electrolytic solution, wherein the positive electrode, the negative electrode, or both the positive electrode and the negative electrode are the electrode for a lithium ion secondary battery according to (6).

Advantageous Effects of Invention

According to the binder composition for lithium ion secondary battery electrodes, the slurry composition for lithium ion secondary battery electrodes, and the electrode for lithium ion secondary batteries of the present invention, a lithium ion secondary battery that can suppress gas generation can be realized.

According to the lithium ion secondary battery of the present invention, gas generation can be suppressed.

DESCRIPTION OF EMBODIMENTS

The present invention will be described hereinbelow in detail by illustrating embodiments and examples. However, the present invention is not limited to the following embodiments and examples, which may be optionally modified without departing from the scope of claims and equivalents thereto.

In the following description, (meth)acrylic acid includes acrylic acid and methacrylic acid. (Meth)acrylate includes acrylate and methacrylate. (Meth)acrylonitrile includes acrylonitrile and methacrylonitrile. (Meth)acrylamide includes acrylamide and methacrylamide.

Furthermore, that a substance is "water-soluble" means that, when 0.5 g of the substance is dissolved in 100 g of water at 25° C., insoluble matter is 0% by weight or more and less than 0.5% by weight. That a substance is "water-insoluble" means that, when 0.5 g of the substance is dissolved in 100 g of water at 25° C., insoluble matter is 90% by weight or more and 100% by weight or less.

In a polymer manufactured by copolymerizing a plurality of types of monomers, the ratio of a structural unit formed by polymerization of a certain monomer relative to the polymer is, unless otherwise stated, usually equals to the ratio (charge ratio) of the certain monomer relative to all monomers used for the polymerization of the polymer.

[1. Binder Composition for Lithium Ion Secondary Battery Electrodes]

The binder composition for lithium ion secondary battery electrodes (when appropriate, this may be referred to hereinbelow as the "binder composition") according to the present invention includes a particulate polymer and a water-soluble polymer.

<1.1. Particulate Polymer>

The particulate polymer is particles of a polymer. When the particulate polymer is contained, the following advantages are usually obtained. That is, binding property of the electrode active material layer can be improved, and strength against a mechanical force exerted on an electrode for lithium ion secondary batteries (when appropriate, this may be referred to hereinbelow as an "electrode") during handling such as winding and conveying can thereby be improved. Furthermore, the tendency to cause removal of the electrode active material from the electrode active material layer is reduced, and the risk of short circuit caused by such unexpected substances is thereby reduced. Furthermore, since the electrode active material can be stably retained in the electrode active material layer, durability such as cycle property and high temperature preservation property can be improved. Furthermore, as the particulate polymer is in a particulate form, the particulate polymer can be bound to the electrode active material at points rather than on planes. Thereby, most part of the surface of the electrode active material is not covered with the polymer. This can increase the area in which ions are exchanged between the electrolytic solution and the electrode active material. Therefore, internal resistance can be decreased, and output property of the lithium ion secondary battery can be improved.

Although a variety of polymers may be used as a polymer constituting the particulate polymer, a water-insoluble polymer is usually used. Examples of the polymer forming the particulate polymer may include polyethylene, polytetrafluoroethylene (PTFE), polyvinylidene fluoride (PVDF), tetrafluoroethylene-hexafluoropropylene copolymer (FEP), polyacrylic acid derivatives, and polyacrylonitrile derivatives.

Furthermore, the soft polymer particles exemplified in the following may also be used as the particulate polymer. Examples of the soft polymer may include:

(i) acrylic-based soft polymers such as polybutyl acrylate, polybutyl methacrylate, polyhydroxyethyl methacrylate, polyacrylamide, polyacrylonitrile, a butyl acrylate.styrene copolymer, a butyl acrylate.acrylonitrile copolymer, and a butyl acrylate.acrylonitrile.glycidyl methacrylate copolymer;

(ii) isobutylene-based soft polymers such as polyisobutylene, a isobutylene.isoprene rubber, and a isobutylene.styrene copolymer;

(iii) diene-based soft polymers such as polybutadiene, polyisoprene, a butadiene.styrene random copolymer, an isoprene-styrene random copolymer, an acrylonitrile.butadiene copolymer, an acrylonitrile.butadienestyrene copolymer, a butadiene.styrene-block copolymer, a styrene-butadiene-styrene-block copolymer, an isoprene.styrene.block copolymer, and a styrene.isoprene.styrene.block copolymer;

(iv) silicon-containing soft polymers such as dimethylpolysiloxane, diphenylpolysiloxane, and dihydroxypolysiloxane;

(v) olefin-based soft polymers such as liquid polyethylene, polypropylene, poly-1-butene, an ethylene.α-olefin copolymer, a propylene.α-olefin copolymer, an ethylene.propylene.diene copolymer (EPDM), and an ethylene.propylene.styrene copolymer;

(vi) vinyl-based soft polymers such as polyvinyl alcohol, polyvinyl acetate, polyvinyl stearate, and a vinyl acetate.styrene copolymer;

(vii) epoxy-based soft polymers such as polyethylene oxide, polypropylene oxide, and an epichlorhydrin rubber;

(viii) fluorine-containing soft polymers such as a vinylidene fluoride-based rubber and a tetrafluoroethylene-propylene rubber; and (ix) other soft polymers such as natural rubber, polypeptide, protein, a polyester-based thermoplastic elastomer, a vinyl chloride-based thermoplastic elastomer, and a polyamide-based thermoplastic elastomer. These soft polymers may have a crosslinked structure, and may also have a functional group introduced by modification. Among these, acrylic-based soft polymers and diene-based soft polymers are preferable.

The acrylic-based soft polymer is a homopolymer of a derivative of acrylic acid or methacrylic acid, or a copolymer of the derivative and another monomer copolymerizable therewith. Among these, a polymer containing a (meth)acrylic acid ester monomer unit is preferable. The (meth)acrylic acid ester monomer unit is a structural unit having a structure that is formed by polymerization of a (meth)acrylic acid ester monomer. However, a (meth)acrylic acid ester monomer containing fluorine is particularly referred to as a fluorine-containing (meth)acrylic acid ester monomer, and distinguished from a (meth)acrylic acid ester monomer.

Examples of the (meth)acrylic acid ester monomer may include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. As the (meth)acrylic acid ester monomer and the (meth)acrylic acid ester monomer unit, one type thereof may be solely used, and two or more types thereof may also be used in combination at any ratio.

The ratio of the (meth)acrylic acid ester monomer unit in the acrylic-based soft polymer is preferably 50% by weight or more, more preferably 70% by weight or more, and particularly preferably 90% by weight or more, and is preferably 99% by weight or less, more preferably 98% by weight or less, and particularly preferably 97% by weight or less.

As the acrylic-based soft polymer, a copolymer containing a combination of a (meth)acrylonitrile monomer unit and a (meth)acrylic acid ester monomer unit is preferable. The (meth)acrylonitrile monomer unit means a structural unit having a structure that is formed by polymerization of (meth)acrylonitrile. The acrylic-based soft polymer containing a combination of the (meth)acrylonitrile monomer unit and the (meth)acrylic acid ester monomer unit is stable against oxidation-reduction. Therefore, a long life battery is likely to be obtained.

The acrylic-based soft polymer may contain, as the (meth)acrylonitrile monomer unit, only a structural unit having a structure that is formed by polymerization of acrylonitrile, only a structural unit having a structure that is formed by polymerization of methacrylonitrile, or both a structural unit having a structure that is formed by polymerization of acrylonitrile and a structural unit having a structure that is formed by polymerization of methacrylonitrile in combination at any ratio.

When the acrylic-based soft polymer contains a combination of the (meth)acrylonitrile monomer unit and the (meth)acrylic acid ester monomer unit, it is preferable that the weight ratio of the (meth)acrylonitrile monomer unit relative to the (meth)acrylic acid ester monomer unit (the weight ratio represented by "(meth)acrylonitrile monomer unit/(meth)acrylic acid ester monomer unit") falls within a predetermined range. Specifically, the aforementioned weight ratio is preferably 1/99 or more, and more preferably 2/98 or more, and is preferably 30/70 or less, and more preferably 25/75 or less. When the aforementioned weight ratio is equal to or more than the lower limit of the aforementioned range, the particulate polymer can be inhibited from swelling due to the electrolytic solution to thereby increase the resistance of the electrode. Thus, reduction in rate property of the lithium ion secondary battery can be suppressed.

The acrylic-based soft polymer may also contain a crosslinkable monomer unit. The crosslinkable monomer unit is a structural unit having a structure that is formed by polymerization of a crosslinkable monomer. The crosslinkable monomer is a monomer that can form a crosslinked structure during or after polymerization by heating or irradiation with energy rays. The inclusion of the crosslinkable monomer unit in the acrylic-based soft polymer enables crosslinking between the particulate polymers or between the water-soluble polymer and the particulate polymer.

Examples of the crosslinkable monomer may include a monomer having two or more reactive groups per molecule. More specific examples thereof may include: a monofunctional monomer having one olefinic double bond per molecule and a thermally crosslinkable group; and a multifunctional monomer having two or more olefinic double bonds per molecule.

Examples of the thermally crosslinkable group contained in the monofunctional monomer may include an epoxy group, an oxetanyl group, an oxazoline group, an N-methylolamido group, and combinations thereof. Among these, an epoxy group is more preferable, because therewith crosslinking and crosslinking densities can be easily adjusted.

Examples of the crosslinkable monomer having an epoxy group as the thermally crosslinkable group and having an olefinic double bond may include unsaturated glycidyl ethers such as vinyl glycidyl ether, allyl glycidyl ether, butenyl glycidyl ether, and o-allylphenyl glycidyl ether; monoepoxides of diene or polyene, such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acid, such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of the crosslinkable monomer having an oxetanyl group as the thermally crosslinkable group and having an olefinic double bond may include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of the crosslinkable monomer having an oxazoline group as the thermally crosslinkable group and having an olefinic double bond may include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the crosslinkable monomer having an N-methylolamido group as the thermally crosslinkable group and having an olefinic double bond may include (meth)acrylamides having a methylol group, such as N-methylol(meth)acrylamide.

Examples of the multifunctional monomer having two or more olefinic double bonds may include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri(meth)acrylate, dipropylene glycol diallyl ether, polyglycol diallyl ether, triethylene glycol divinyl ether, hydroquinone diallyl ether, tetraallyl oxyethane, trimethylolpropane-diallyl ether, allyl or vinyl ether of other multifunctional alcohols, triallylamine, methylenebisacrylamide, and divinylbenzene.

Among these, as the crosslinkable monomer, N-methylolacrylamide, ethylene dimethacrylate, allyl glycidyl ether, glycidyl methacrylate, and ethylene glycol dimethacrylate are preferable, and ethylene dimethacrylate and glycidyl methacrylate are more preferable. As the crosslinkable monomer and the crosslinkable monomer unit, one type thereof may be solely used, and two or more types thereof may also be used in combination at any ratio.

The crosslinkable monomer unit may be introduced to the acrylic-based soft polymer by copolymerizing the crosslinkable monomer with the (meth)acrylic acid ester monomer unit. Introduction of the crosslinkable monomer unit to the acrylic-based soft polymer may also be performed by introducing the crosslinkable group to the acrylic-based soft polymer by a conventional modification method using a compound having the crosslinkable group (crosslinking agent).

Examples of the crosslinking agent may include: organic peroxides; and crosslinking agents that exert their effects with heat or light. As the crosslinking agent, one type thereof may be solely used, and two or more types thereof may also be used in combination at any ratio.

Among the crosslinking agents, organic peroxides, and the crosslinking agents that can initiate a crosslinking reaction with heat are preferable, because these contains a thermally crosslinkable group.

The ratio of the crosslinkable monomer unit in the acrylic-based soft polymer relative to 100 parts by weight of a total amount of the (meth)acrylonitrile monomer unit and the (meth)acrylic acid ester monomer unit is preferably 0.01 parts by weight or more, and more preferably 0.05 parts by weight or more, and is preferably 5 parts by weight or less, more preferably 4 parts by weight or less, and particularly preferably 3 parts by weight or less.

The acrylic-based soft polymer may further include an optional structural unit other than the aforementioned (meth)acrylonitrile monomer unit, (meth)acrylic acid ester monomer unit, and crosslinkable group monomer unit. Examples of monomers corresponding to these optional structural units may include styrene-based monomers such as styrene, chlorostyrene, vinyl toluene, t-butylstyrene, vinylbenzoic acid, methyl vinylbenzoate, vinyl naphthalene, chloromethylstyrene, α-methylstyrene, and divinylbenzene; olefins such as ethylene and propylene; diene monomers such as butadiene and isoprene; halogen atom-containing monomers such as vinyl chloride and vinylidene chloride; vinyl esters such as vinyl acetate, vinyl propionate, and vinyl butyrate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocyclic ring-containing vinyl compounds such as N-vinylpyrrolidone, vinyl pyridine, and vinyl imidazole; and amide-based monomers such as acrylamide and acrylamide-2-methylpropanesulfonic acid. One type of them may be solely used, and two or more types thereof may also be used in combination at any ratio. However, from the viewpoint of significantly exerting the effect obtained by containing a combination of the aforementioned (meth)acrylonitrile monomer unit and (meth)acrylic acid ester monomer unit, the optional structural unit is preferably small in amount, and is particularly preferably not contained.

The diene-based soft polymer is a polymer containing an aliphatic conjugated diene monomer unit. The aliphatic conjugated diene monomer unit is a structural unit having a structure that is formed by polymerization of an aliphatic conjugated diene monomer.

Examples of the aliphatic conjugated diene monomer may include 1,3-butadiene, 2-methyl-1,3-butadiene, 2,3-dimethyl-1,3-butadiene, and 2-chloro-1,3-butadiene; pentadiene having a conjugated double bond on a straight chain and a substitution product thereof; and hexadiene having a conjugated double bond on a side chain and a substitution product thereof. Among these, 1,3-butadiene is preferable. As the aliphatic conjugated diene monomer and the aliphatic conjugated diene monomer unit, one type thereof may be solely used, and two or more types thereof may also be used in combination at any ratio.

The ratio of the aliphatic conjugated diene monomer unit in the diene-based soft polymer is preferably 20% by weight or more, and more preferably 30% by weight or more, and is preferably 70% by weight or less, more preferably 60% by weight or less, and particularly preferably 55% by weight or less.

It is preferable that the diene-based soft polymer contains an aromatic vinyl monomer unit. The aromatic vinyl monomer unit is a structural unit having a structure that is formed by polymerization of an aromatic vinyl monomer.

Examples of the aromatic vinyl monomer may include styrene, α-methylstyrene, vinyltoluene, and divinylbenzene. Among these, styrene is preferable. It is preferable that the diene-based soft polymer contains both of the aliphatic conjugated diene monomer unit and the aromatic vinyl monomer unit, and is preferably, e.g., a styrene-butadiene copolymer. As the aromatic vinyl monomer and the aromatic vinyl monomer unit, one type thereof may be solely used, and two or more types thereof may also be used in combination at any ratio.

When a combination of the aliphatic conjugated diene monomer and the aromatic vinyl monomer is used for manufacturing the diene-based soft polymer, the obtained diene-based soft polymer sometimes contains, as residual monomers, an unreacted aliphatic conjugated diene monomer and an unreacted aromatic vinyl monomer. In that case, the amount of the unreacted aliphatic conjugated diene monomer contained in the diene-based soft polymer is preferably 50 ppm or less, more preferably 10 ppm or less, and ideally 0 ppm. The amount of the unreacted aromatic vinyl monomer contained in the diene-based soft polymer is preferably 1000 ppm or less, more preferably 200 ppm or less, and ideally 0 ppm.

The ratio of the aromatic vinyl monomer unit in the diene-based soft polymer is preferably 30% by weight or more, and more preferably 35% by weight or more, and is preferably 79.5% by weight or less, and more preferably 69% by weight or less.

The diene-based soft polymer may contain an optional structural unit other than the aforementioned structural units, as long as the effects of the present invention are not significantly impaired. Examples of the monomer corresponding to the optional structural unit may include a vinyl cyanide monomer, an unsaturated carboxylic acid alkyl ester monomer, an unsaturated monomer containing a hydroxyalkyl group, and an unsaturated carboxylic acid amide monomer. One type of them may be solely used, and two or more types thereof may also be used in combination at any ratio.

Examples of the vinyl cyanide monomer may include acrylonitrile, methacrylonitrile, α-chloroacrylonitrile, and α-ethylacrylonitrile. Among these, acrylonitrile and methacrylonitrile are preferable.

Examples of the unsaturated carboxylic acid alkyl ester monomer may include methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, and 2-ethylhexyl acrylate. Among these, methyl methacrylate is preferable.

Examples of the unsaturated monomer containing a hydroxyalkyl group may include β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethylene glycol)maleate, di-(ethylene glycol)itaconate, 2-hydroxyethyl maleate, bis(2-hydroxyethyl) maleate, and 2-hydroxyethyl methyl fumarate. Among these, β-hydroxyethyl acrylate is preferable.

Examples of the unsaturated carboxylic acid amide monomer may include acrylamide, methacrylamide, N-methylolacrylamide, N-methylolmethacrylamide, and N,N-dimethylacrylamide. Among these, acrylamide and methacrylamide are preferable.

Furthermore, the diene-based soft polymer may include a structural unit having a structure that is formed by polymerization of a monomer used in a usual emulsion polymerization, such as ethylene, propylene, vinyl acetate, vinyl propionate, vinyl chloride, and vinylidene chloride.

Furthermore, it is preferable that the particulate polymer further includes an ethylenically unsaturated carboxylic acid monomer unit. Among these, when the diene-based soft polymer is used as the particulate polymer, it is particularly preferable that the diene-based soft polymer includes the ethylenically unsaturated carboxylic acid monomer unit. The ethylenically unsaturated carboxylic acid monomer unit is a structural unit having a structure that is formed by polymerization of an ethylenically unsaturated carboxylic acid monomer. When the ethylenically unsaturated carboxylic acid monomer unit is contained in the particulate polymer, the following advantages are usually obtained. That is, since the ethylenically unsaturated carboxylic acid monomer contains a carboxy group (—COOH group), the use of the ethylenically unsaturated carboxylic acid monomer allows the particulate polymer to have high polarity. This can further enhance binding property of the particulate polymer. Furthermore, since the ethylenically unsaturated carboxylic acid monomer unit has high mechanical strength, it can reinforce strength of the particulate polymer to enhance binding property of the electrode active material layer to the current collector. Therefore, for example, peeling of the electrode active material layer from the current collector can be stably prevented, and mechanical strength of the electrode active material layer can be improved. Furthermore, since the polarity possessed by the carboxy group can enhance compatibility of the particulate polymer with water, the particulate polymer can be stably dispersed in a solvent such as water, to improve stability of the binder composition and the slurry composition for lithium ion secondary battery electrodes (when appropriate, this may be referred to hereinbelow as the "slurry composition").

Furthermore, since the polarity possessed by the carboxy group improves compatibility of the particulate polymer with a polar solvent, wettability of the particulate polymer to the electrolytic solution can be improved. Examples of the ethylenically unsaturated carboxylic acid monomer may include an unsaturated mono-carboxylic acid and a derivative thereof, and an unsaturated dicarboxylic acid and an acid anhydride thereof, and derivatives thereof. Examples of the unsaturated mono-carboxylic acid may include acrylic acid, methacrylic acid, and crotonic acid. Examples of the derivative of the unsaturated mono-carboxylic acid may include 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of the unsaturated dicarboxylic acid may include maleic acid, fumaric acid, and itaconic acid. Examples of the acid anhydride of the unsaturated dicarboxylic acid may include maleic anhydride, acrylic acid anhydride, methylmaleic acid anhydride, and dimethylmaleic acid anhydride. Examples of the derivative of the unsaturated dicarboxylic acid may include substituted maleic acids such as methylmaleic acid, dimethylmaleic acid, phenylmaleic acid, chloromaleic acid, dichloromaleic acid, and fluoromaleic acid; and maleic acid esters such as methyl allyl maleate, diphenyl maleate, nonyl maleate, decyl maleate, dodecyl maleate, octadecyl maleate, and fluoroalkyl maleate. Among these, from the viewpoint of improvement in stability of the particulate polymer in the binder composition, unsaturated mono-carboxylic acids such as acrylic acid and methacrylic acid, and unsaturated dicarboxylic acids such as maleic acid, fumaric acid, and itaconic acid are preferable; and acrylic acid, methacrylic acid, and itaconic acid are more preferable; and itaconic acid is particularly preferable. As the ethylenically unsaturated carboxylic acid monomer and the ethylenically unsaturated carboxylic acid monomer unit, one type thereof may be solely used, and two or more types thereof may also be used in combination at any ratio.

The ratio of the ethylenically unsaturated carboxylic acid monomer unit in the particulate polymer is preferably 0.5% by weight or more, more preferably 1% by weight or more, further preferably 1.5% by weight or more, and particularly preferably 2% by weight or more, and is preferably 10% by weight or less, more preferably 8% by weight or less, further preferably 7% by weight or less, and particularly preferably 5% by weight or less. When the ratio of the ethylenically unsaturated carboxylic acid monomer unit is equal to or more than the lower limit of the aforementioned range, binding property between the current collector and the electrode active material layer can be enhanced. When the ratio is equal to or less than the upper limit, the lithium ion secondary battery can have enhanced cycle property.

As the particulate polymer, one type thereof may be solely used, and two or more types thereof may also be used in combination at any ratio.

The weight average molecular weight of the polymer constituting the particulate polymer is preferably 10,000 or more, and more preferably 20,000 or more, and is preferably 1,000,000 or less, and more preferably 500,000 or less. When the weight average molecular weight of the polymer constituting the particulate polymer falls within the aforementioned range, strength of the electrode and dispersibility of the electrode active material are likely to be made favorable. The weight average molecular weight of the polymer constituting the particulate polymer may be obtained as a polystyrene equivalent value obtained by gel permeation chromatography (GPC) using tetrahydrofuran as eluent.

The glass transition temperature of the particulate polymer is preferably −75° C. or higher, more preferably −55° C. or higher, and particularly preferably −35° C. or higher, and is preferably 40° C. or lower, more preferably 30° C. or lower, still more preferably 20° C. or lower, and particularly preferably 15° C. or lower. When the glass transition temperature of the particulate polymer falls within the aforementioned range, properties such as flexibility and winding property of the electrode, and binding property between the electrode active material layer and the current collector are well balanced in a preferable manner. The glass transition temperature of the particulate polymer may be adjusted by, e.g., combining a variety of monomers.

The volume average particle size D50 of the particulate polymer is preferably 50 nm or more, and more preferably 70 nm or more, and is preferably 500 nm or less, and more preferably 400 nm or less. When the volume average particle size D50 of the particulate polymer falls within the aforementioned range, strength and flexibility of the electrode can be made favorable. The volume average particle size is a particle size at the cumulative volume of 50% calculated from the small diameter side in a particle size distribution measured by a laser diffraction method.

The method for manufacturing the particulate polymer is not particularly limited, and may be any method such as a solution polymerization method, a suspension polymerization method, and an emulsion polymerization. Among these, since polymerization can be performed in water and the obtained product as it is can be used as a material of the binder composition according to the present invention, an emulsion polymerization and a suspension polymerization method are preferable. It is preferable that, when manufacturing the particulate polymer, the reaction system contains a dispersing agent. Usually, the particulate polymer substantially consists of the polymer that constitutes the particulate polymer, but the polymer may be accompanied with optional components such as additives added during the polymerization.

<1.2. Water-Soluble Polymer>

The binder composition according to the present invention includes a water-soluble polymer. This water-soluble polymer can exert the action of binding the electrode active material and the current collector by lying between the electrode active materials and between the electrode active material and the current collector in the electrode active material layer. In a slurry composition containing the water-soluble polymer, the electrode active material, and water, part of the water-soluble polymer is liberated in water, but another part of the water-soluble polymer may be adsorbed to the surface of the electrode active material to form a stable layer covering the electrode active material, thereby exerting the action of increasing the dispersibility of the electrode active material. Furthermore, the water-soluble polymer usually forms a stable layer covering the electrode active material even in the electrode active material layer to exert the action of suppressing decomposition of the electrolytic solution.

The water-soluble polymer includes an ethylenically unsaturated carboxylic acid monomer unit. The use of the ethylenically unsaturated carboxylic acid monomer unit can enhance the polarity of the water-soluble polymer, to thereby express water solubility in the water-soluble polymer. Furthermore, the use of the ethylenically unsaturated carboxylic acid monomer can usually enhance binding property of the water-soluble polymer to the current collector and the electrode active material.

Examples of the ethylenically unsaturated carboxylic acid monomer may be the same as those listed as examples in the discussion of the particulate polymer. Among these, acrylic acid, methacrylic acid, and itaconic acid are preferable, and acrylic acid and methacrylic acid are particularly preferable. As the ethylenically unsaturated carboxylic acid monomer and the ethylenically unsaturated carboxylic acid monomer unit, one type thereof may be solely used, and two or more types thereof may also be used in combination at any ratio.

The ratio of the ethylenically unsaturated carboxylic acid monomer unit in the water-soluble polymer is usually 20% by weight or more, and preferably 25% by weight or more, and is usually 85% by weight or less, and preferably 80% by weight or less. When the ratio of the ethylenically unsaturated carboxylic acid monomer unit is equal to or more than the lower limit of the aforementioned range, binding property of the water-soluble polymer to the current collector and to the electrode active material can be enhanced, to thereby increase the binding property between the current collector and the electrode active material layer. When the ratio thereof is equal to or less than the upper limit, battery cycle property can be made favorable.

The water-soluble polymer includes, in combination with the aforementioned ethylenically unsaturated carboxylic acid monomer unit, a carboxylic acid amide monomer unit. The carboxylic acid amide monomer unit is a structural unit having a structure that is formed by polymerization of a carboxylic acid amide monomer. The carboxylic acid amide monomer is a monomer having an amido group bound to a carboxylic acid group, and includes not only an amide compound but also an imide compound. The inclusion of the carboxylic acid amide monomer unit in the water-soluble polymer can inhibit generation of a gas in a lithium ion secondary battery. Although the reason for such inhibition of gas generation is not necessarily identified, it is inferred that the water-soluble polymer containing the carboxylic acid amide monomer unit traps halide ions in the electrolytic solution, thereby enabling inhibition of gas generation caused by halide ions.

Examples of the carboxylic acid amide monomer may include unsaturated carboxylic acid amide compounds such as (meth)acrylamide, α-chloroacrylamide, N,N'-methylenebis(meth)acrylamide, N,N'-ethylenebis(meth)acrylamide, N-hydroxymethyl (meth)acrylamide, N-2-hydroxyethyl (meth)acrylamide, N-2-hydroxypropyl (meth)acrylamide, N-3-hydroxypropyl (meth)acrylamide, crotonic acid amide, maleic acid diamide, fumaric acid diamide, and diacetone acrylamide; and N-aminoalkyl derivatives of unsaturated carboxylic acid amides such as N-dimethylaminomethyl (meth)acrylamide, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-2-diethylaminoethyl (meth)acrylamide, N-3-aminopropyl (meth)acrylamide, N-3-methylaminopropyl (meth)acrylamide, and N-3-dimethylaminopropyl (meth)acrylamide. Among these, (meth)acrylamide, N-2-dimethylaminoethyl (meth)acrylamide, and N-3-dimethylaminopropyl (meth)acrylamide are preferable, and (meth)acrylamide is more preferable. As the carboxylic acid amide monomer and the carboxylic acid amide monomer unit, one type thereof may be solely used, and two or more types thereof may also be used in combination at any ratio.

The ratio of the carboxylic acid amide monomer unit in the water-soluble polymer is usually 0.1% by weight or more, and preferably 0.2% by weight or more, and is usually 10% by weight or less, and preferably 5% by weight or less. When the ratio of the carboxylic acid amide monomer unit is equal to or more than the lower limit of the aforementioned range, gas generation in the lithium ion secondary battery can be inhibited. When the ratio thereof is equal to or less than the upper limit, the water-soluble polymer can be prevented from eluting into the electrolytic solution, thereby enabling stable exertion of actions provided by the water-soluble polymer, such as an action of forming a layer on the surface of the electrode active material to suppress decomposition of the electrolytic solution; an action of trapping halide ions to suppress gas generation; and an action of binding the electrode active materials to each other.

The water-soluble polymer includes, in combination with the aforementioned ethylenically unsaturated carboxylic acid monomer unit and the carboxylic acid amide monomer unit, a crosslinkable monomer unit. The inclusion of the crosslinkable monomer unit in the water-soluble polymer enables crosslinking of the water-soluble polymer, thereby enhancing the strength and stability of the electrode active material layer. This causes stable exertion of actions provided by the water-soluble polymer, such as an action of forming a layer on the electrode active material to suppress decomposition of the electrolytic solution; an action of trapping halide ions to suppress gas generation; and an action of binding the electrode active materials to each other. Furthermore, swelling of the electrode active material layer due to the electrolytic solution can usually be suppressed, and thus the lithium ion secondary battery can have favorable low temperature property.

As the crosslinkable monomer, a monomer that can form a crosslinked structure during polymerization may be used. Examples of the crosslinkable monomer may be the same as those listed as examples in the discussion of the particulate polymer.

Among these, as the crosslinkable monomer, N-methylolacrylamide, ethylene dimethacrylate, allyl glycidyl ether, glycidyl methacrylate, and ethylene glycol dimethacrylate are preferable, and ethylene dimethacrylate and glycidyl methacrylate are more preferable.

As the crosslinkable monomer and the crosslinkable monomer unit, one type thereof may be solely used, and two or more types thereof may also be used in combination at any ratio.

The ratio of the crosslinkable monomer unit in the water-soluble polymer is usually 0.1% by weight or more, and preferably 0.2% by weight or more, and is usually 2.0% by weight or less, and preferably 1.5% by weight or less. When the ratio of the crosslinkable monomer unit is equal to or more than the lower limit of the aforementioned range, binding property between the electrode active material layer and the current collector can be enhanced. When the ratio thereof is equal to or less than the upper limit, durability of the electrode can be enhanced.

It is preferable that the water-soluble polymer includes a fluorine-containing monomer unit. The fluorine-containing monomer unit is a structural unit having a structure that is formed by polymerization of a fluorine-containing monomer. Since the fluorine-containing monomer unit usually has high ion conductivity, the water-soluble polymer can have increased ion conductivity and reduced electrode resistance.

Examples of the fluorine-containing monomer may include a fluorine-containing (meth)acrylic acid ester monomer and a fluorine-containing aromatic diene monomer. Among these, a fluorine-containing (meth)acrylic acid ester monomer is preferable.

Examples of the fluorine-containing (meth)acrylic acid ester monomer may include a monomer represented by the following formula (I).

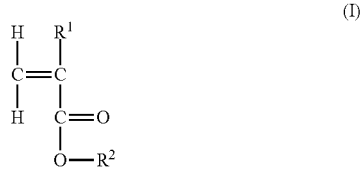

In the formula (I), $R^1$ represents a hydrogen atom or a methyl group.

In the aforementioned formula (I), $R^2$ represents a hydrocarbon group containing a fluorine atom. The number of carbon atoms in the hydrocarbon group is preferably one or more, and preferably 18 or less. The number of fluorine atoms contained in $R^2$ may be one, and may also be two or more.

Examples of the fluorine-containing (meth)acrylic acid ester monomer represented by the formula (I) may include fluorinated alkyl (meth)acrylate, fluorinated aryl (meth)acrylate, and fluorinated aralkyl (meth)acrylate. Among these, fluorinated alkyl (meth)acrylate is preferable. Specific examples of such a monomer may include 2,2,2-trifluoroethyl (meth)acrylate; β-(perfluorooctyl)ethyl (meth)acrylate; 2,2,3,3-tetrafluoropropyl (meth)acrylate; 2,2,3,4,4,4-hexafluorobutyl (meth)acrylate; 3[4[1-trifluoromethyl-2,2-bis[bis(trifluoromethyl)fluoromethyl]ethynyloxy]benzoxy]2-hydroxypropyl (meth)acrylate; and (meth)acrylic acid perfluoroalkyl esters such as 1H,1H,9H-perfluoro-1-nonyl (meth)acrylate, 1H,1H,11H-perfluoroundecyl (meth)acrylate, perfluorooctyl (meth)acrylate, perfluoroethyl (meth)acrylate, and trifluoromethyl (meth)acrylate.

As the fluorine-containing monomer and the fluorine-containing monomer unit, one type thereof may be solely used, and two or more types thereof may also be used in combination at any ratio.

The ratio of the fluorine-containing monomer unit in the water-soluble polymer is preferably 0.1% by weight or more, and more preferably 1% by weight or more, and is preferably 30% by weight or less, and more preferably 25% by weight or less. When the ratio of the fluorine-containing monomer unit is equal to or more than the lower limit of the aforementioned range, the lithium ion secondary battery can have increased cycle property. When the ratio thereof is equal to or less than the upper limit, binding property between the current collector and the electrode active material layer can be enhanced.

The water-soluble polymer may include a reactive surfactant unit. The reactive surfactant unit is a structural unit having a structure that is formed by polymerization of a reactive surfactant. The reactive surfactant unit constitutes part of the water-soluble polymer, and can function as a surfactant.

The reactive surfactant is a monomer having a polymerizable group that is capable of being copolymerized with another monomer, and also having a surface active group (a hydrophilic group and a hydrophobic group). Usually, the reactive surfactant has a polymerizable unsaturated group which also acts as a hydrophobic group after polymerization. Examples of the polymerizable unsaturated group possessed by the reactive surfactant may include a vinyl group, an allyl group, a vinylidene group, a propenyl group, an isopropenyl group, and an isobutylidene group. As the polymerizable unsaturated group, one type thereof may be solely used, and two or more types thereof may also be used in combination at any ratio.

The reactive surfactant usually has a hydrophilic group as a portion that expresses hydrophilicity. The reactive surfactants are classified into anionic, cationic, and nonionic surfactants, on the basis of the type of the hydrophilic group.

Examples of the anionic hydrophilic group may include —SO$_3$M, —COOM, and —PO(OH)$_2$. M herein stands for a hydrogen atom or a cation. Examples of the cation may include alkali metal ions such as lithium, sodium, and potassium; alkaline earth metal ions such as calcium and magnesium; an ammonium ion; ammonium ions of alkylamine such as monomethylamine, dimethylamine, monoethylamine, and triethylamine; and ammonium ions of alkanolamine such as monoethanolamine, diethanolamine, and triethanolamine.

Examples of the cationic hydrophilic group may include primary amine salts such as —NH₂HX, secondary amine salts such as —NHCH₃HX, tertiary amine salts such as —N(CH₃)₂HX, and quaternary amine salts such as —N⁺(CH₃)₃X⁻. X herein represents a halogen group.

Examples of the nonionic hydrophilic group may include —OH.

Suitable examples of the reactive surfactant may include a compound represented by the following formula (II).

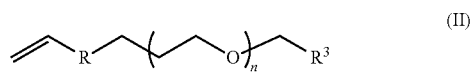

(II)

In the formula (II), R represents a divalent linking group. Examples of R may include a —Si—O— group, a methylene group, and a phenylene group.

In the formula (II), $R^3$ represents a hydrophilic group. Examples of $R^3$ may include —SO₃NH₄.

In the formula (II), n represents an integer of 1 to 100.

Another suitable example of the reactive surfactant may be a compound having a structural unit that has a structure that is formed by polymerization of ethylene oxide and a structural unit that has a structure that is formed by polymerization of butylene oxide, and further having, at a terminal, an alkenyl group with a terminal double bond and also having —SO₃NH₄. Specific examples of such a reactive surfactant includes trade name "LATEMUL PD-104" and "LATEMUL PD-105" manufactured by Kao Corporation.

As the reactive surfactant and the reactive surfactant unit, one type thereof may be solely used, and two or more types thereof may also be used in combination at any ratio. The ratio of the reactive surfactant unit in the water-soluble polymer is preferably 0.1% by weight or more, more preferably 0.2% by weight or more, and particularly preferably 0.5% by weight or more, and is preferably 5% by weight or less, more preferably 4% by weight or less, and particularly preferably 2% by weight or less. When the ratio of the reactive surfactant unit is equal to or more than the lower limit of the aforementioned range, the binder composition and the slurry composition can have improved dispersibility. When the ratio thereof is equal to or less than the upper limit, the electrode can have improved durability.

The water-soluble polymer may include an optional structural unit, other than the aforementioned ethylenically unsaturated carboxylic acid monomer unit, carboxylic acid amide monomer unit, crosslinkable monomer unit, fluorine-containing monomer unit, and reactive surfactant unit.

For example, the water-soluble polymer may include a (meth)acrylic acid ester monomer unit.

Examples of the (meth)acrylic acid ester monomer may be the same as those listed as examples in the discussion of the particulate polymer. Among these, from the viewpoint of softness and solubility, ethyl acrylate, n-butyl acrylate, and 2-ethylhexyl acrylate are preferable. As the (meth)acrylic acid ester monomer and the (meth)acrylic acid ester monomer unit, one type thereof may be solely used, and two or more types thereof may also be used in combination at any ratio.

The ratio of the (meth)acrylic acid ester monomer unit in the water-soluble polymer is preferably 25% by weight or more, more preferably 30% by weight or more, and particularly preferably 35% by weight or more, and is preferably 75% by weight or less, more preferably 70% by weight or less, and particularly preferably 65% by weight or less. When the amount of the (meth)acrylic acid ester monomer unit is equal to or more than the lower limit of the aforementioned range, binding property of the electrode active material layer to the current collector can be enhanced. When the amount thereof is equal to or less than the upper limit, the electrode can have increased softness.

A further example of the optional structural unit that can be possessed by the water-soluble polymer may be a structural unit having a structure that is formed by polymerization of the following monomers. That is, examples of such a structural unit may include a structural unit having a structure that is formed by polymerization of one or more of: aromatic vinyl monomers such as styrene, chlorostyrene, vinyl toluene, t-butylstyrene, vinylbenzoic acid, methyl vinylbenzoate, vinyl naphthalene, chloromethylstyrene, hydroxymethylstyrene, α-methylstyrene, and divinylbenzene; α,β-unsaturated nitrile compound monomers such as acrylonitrile and methacrylonitrile; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocyclic ring-containing vinyl compound monomers such as N-vinylpyrrolidone, vinyl pyridine, and vinyl imidazole. One type of them may be solely used, and two or more types thereof may also be used in combination at any ratio.

The weight average molecular weight of the water-soluble polymer is preferably 5,000 or more, and more preferably 10,000 or more, and is preferably 200,000 or less, and more preferably 150,000 or less. When the weight average molecular weight of the water-soluble polymer is equal to or more than the lower limit of the aforementioned range, adhesion between the current collector and the electrode active material layer can be enhanced. When the weight average molecular weight is equal to or less than the upper limit, the lithium ion secondary battery can have enhanced cycle property. The weight average molecular weight of the water-soluble polymer may be obtained as a polystyrene equivalent value by GPC using as eluent a solution of 0.85 g/mL of sodium nitrate dissolved in a 10% by volume aqueous solution of dimethyl formamide.

The weight ratio between the particulate polymer and the water-soluble polymer as "particulate polymer"/"water-soluble polymer" is preferably 50.0/50.0 or more, more preferably 55.0/45.0 or more, and particularly preferably 60.0/40.0 or more, and is preferably 99.0/1.0 or less, more preferably 98.0/2.0 or less, and particularly preferably 97.0/3.0 or less. When the weight ratio is equal to or more than the lower limit of the aforementioned range, the lithium ion secondary battery can have enhanced cycle property. When the weight ratio is equal to or less than the upper limit, binding property between the electrode active material layer and the current collector can be enhanced.

The water-soluble polymer may be manufactured by, e.g., polymerizing a monomer composition containing the aforementioned monomers in an aqueous solvent. The ratio of each monomer in the monomer composition is usually set to the ratio that is the same as the ratio of each structural unit in the water-soluble polymer.

As the aqueous solvent, an aqueous solvent in which the water-soluble polymer can be dispersed may be used. Usually, the aqueous solvent is selected from aqueous solvents having a boiling point under normal pressure of preferably 80° C. or higher, and more preferably 100° C. or higher, and is preferably 350° C. or lower, and more preferably 300° C. or lower. Examples of the aqueous solvent will be listed in the following. In the following examples, numeric values in parentheses after solvent names are boiling points under normal pressure (unit: ° C.). The portion of the values smaller than the decimal point are rounded off or rounded down.

Examples of the aqueous solvent may include water (100); ketones such as diacetone alcohol (169) and γ-butyrolactone (204); alcohols such as ethyl alcohol (78), isopropyl alcohol (82), and normal propyl alcohol (97); glycol ethers such as propylene glycol monomethyl ether (120), methyl cellosolve (124), ethyl cellosolve (136), ethylene glycol tertiary-butyl ether (152), butyl cellosolve (171), 3-methoxy-3-methyl-1-butanol (174), ethylene glycol monopropyl ether (150), diethylene glycol monobutyl ether (230), triethylene glycol monobutyl ether (271), and dipropylene glycol monomethyl ether (188); and ethers such as 1,3-dioxolane (75), 1,4-dioxolane (101), and tetrahydrofuran (66). Among these, water is particularly preferable, because water is not combustible, and a dispersion of a polymer can be easily obtained. Alternatively, water may be used as a main solvent, and any of the aforementioned aqueous solvents other than water may be mixed therewith as long as the dispersion state of the polymer can be ensured.

The manner of polymerizing the monomer components is not particularly limited. For example, any of a solution polymerization method, a suspension polymerization method, a bulk polymerization method, and an emulsion polymerization may be employed. Among these, an emulsion polymerization is particularly preferable from the viewpoint of manufacturing efficiency. In the emulsion polymerization, a product with high molecular weight is likely to be obtained. Furthermore, the polymerization product is obtained in a state of being dispersed in water as it is, whereby re-dispersion treatment is unnecessary and the polymerization product as it is can be used for manufacture of the binder composition.

As the polymerization method, e.g., any of ion polymerization, radical polymerization, and living radical polymerization may be employed. Among these polymerization methods, radical polymerization, which is excellent in polymerization efficiency, is preferable.

The emulsion polymerization is usually performed by a conventional method. For example, the polymerization may be performed in accordance with the method described in "Jikken Kagaku Kouza (Course of Experimental Chemistry)" Vol. 28 (Publisher: Maruzen, edited by The Chemical Society of Japan). Specifically, the method includes charging water, additives such as a dispersing agent, an emulsifier, and a crosslinking agent, a polymerization initiator, and a monomer at a specific ratio into a closed container equipped with a stirrer and a heater; stirring the composition in the container to allow the monomer, etc. to be emulsified in water; and elevating the temperature while stirring for initiating polymerization. Alternatively, the aforementioned composition is placed in a closed container after having been emulsified, and after that, the reaction is similarly initiated.

Examples of the polymerization initiator may include organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as α,α'-azobisisobutyronitrile; ammonium persulfate; and potassium persulfate. As the polymerization initiator, one type thereof may be solely used, and two or more types thereof may also be used in combination at any ratio.

The additives such as the emulsifier, the dispersing agent, and the polymerization initiator are those that are generally used in these polymerization methods. The using amounts are set to the amounts for general use.

The polymerization temperature and the polymerization time may be optionally selected depending on the types of the polymerization method, the polymerization initiator, etc. Usually, the polymerization temperature is approximately 30° C. or higher, and the polymerization time is approximately 0.5 hours to 30 hours.

Additives such as amine may be used as a polymerization auxiliary agent.

As a result of the polymerization, a reaction solution containing the water-soluble polymer may usually be obtained. The obtained reaction solution is usually acidic, and the water-soluble polymer is often dispersed in the aqueous solvent. The water-soluble polymer dispersed in the water-soluble solvent may usually be made soluble in an aqueous solvent by adjusting the pH of the reaction solution at, e.g., 7 to 13. The water-soluble polymer may be isolated from the reaction solution obtained in this manner. However, water is usually used as an aqueous medium, and the water-soluble polymer in a state of being dissolved in this water is used to manufacture the binder composition according to the present invention.

Examples of the method for alkalizing the reaction solution to pH 7 to pH 13 may include adding an aqueous alkali metal solution such as an aqueous hydroxylation lithium solution, an aqueous sodium hydroxide solution, and an aqueous potassium hydroxide solution; an aqueous alkali earth metal solution such as an aqueous calcium hydroxide solution and an aqueous magnesium hydroxide solution; or an aqueous alkaline solution such as an aqueous ammonia solution. As the aforementioned aqueous alkaline solution, one type thereof may be solely used, and two or more types thereof may also be used in combination at any ratio.

<1.3. Solvent>

The binder composition according to the present invention usually includes a solvent. As the solvent, water is usually used. In the binder composition according to the present invention, the particulate polymer is dispersed in water, and the water-soluble polymer is dissolved in water.

Alternatively, as the solvent, a combination of water with a solvent other than water may also be used. For example, a combination of a liquid in which the water-soluble polymer can be dissolved and water is preferable, because therein the water-soluble polymer is adsorbed on the surface of the electrode active material, and dispersion of the electrode active material is thereby stabilized.

The type of the liquid used in combination with water is preferably selected from the viewpoint of drying speed and environment. Preferable examples thereof may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methylpyrrolidone and N,N-dimethylformamide. Among these, N-methylpyrrolidone (NMP) is preferable. One type of them may be solely used, and two or more types thereof may also be used in combination at any ratio.

The amount of the solvent may be appropriately adjusted so as to obtain a concentration and viscosity which are suitable for manufacture of the binder composition and manufacture of the slurry composition using the binder composition. Specifically, the amount of the solvent may be set such that the concentration of a solid content in a total amount of the binder composition is preferably 10% by weight or more, more preferably 15% by weight or more, and particularly preferably 20% by weight or more, and is preferably 60% by weight or less, more preferably 55% by weight or less, and particularly preferably 50% by weight or less. The solid content of the binder composition herein refers to a substance that remains after drying of the binder composition.

<1.4. Optional Component>

The binder composition according to the present invention may include an optional component other than the aforementioned particulate polymer, water-soluble polymer, and solvent, as long as the effects of the present invention are not significantly impaired. As the optional component, one type thereof may be solely used, and two or more types thereof may also be used in combination at any ratio.

<1.5. Method for Manufacturing Binder Composition>

The method for manufacturing the binder composition according to the present invention is not limited. For example, the binder composition according to the present invention may be manufactured by mixing the aforementioned particulate polymer, water-soluble polymer, and solvent in any order.

When the particulate polymer is used in a state of an aqueous dispersion or when the water-soluble polymer is used in a state of an aqueous solution, water may be mixed additionally to these aqueous dispersion and aqueous solution. Alternatively, water may not be additionally mixed to these aqueous dispersion and aqueous solution. Usually, water is mixed additionally to these aqueous dispersion and aqueous solution, so that the solid content concentration of the binder composition is adjusted to fall within a desired range.

Examples of the apparatus for mixing may include mixers such as a ball mill, a sand mill, a bead mill, a roll mill, a pigment disperser, a kneader, an ultrasonic disperser, a homogenizer, a homomixer, and a planetary mixer.

[2. Slurry Composition for Lithium Ion Secondary Battery Electrodes]

The slurry composition according to the present invention includes the binder composition according to the present invention and an electrode active material.

<2.1. Electrode Active Material>

As the electrode active material for positive electrodes (when appropriate, this may be referred to hereinbelow as the "positive electrode active material"), among the electrode active materials, a substance in which lithium ions can be intercalated and deintercalated is usually used. Such positive electrode active materials are roughly classified into a material composed of inorganic compounds and a material composed of organic compounds.

Examples of the positive electrode active material composed of inorganic compounds may include transition metal oxide, transition metal sulfide, and lithium-containing composite metal oxide of lithium and transition metal. Examples of the aforementioned transition metal may include Ti, V, Cr, Mn, Fe, Co, Ni, Cu, and Mo.

Examples of the transition metal oxide may include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, and $V_6O_{13}$. Among these, MnO, $V_2O_5$, $V_6O_{13}$, and $TiO_2$ are preferable in terms of cycle stability and capacity.

Examples of the transition metal sulfide may include $TiS_2$, $TiS_3$, amorphous $MoS_2$, and FeS.

Examples of the lithium-containing composite metal oxide may include lithium-containing composite metal oxide having a layer structure, lithium-containing composite metal oxide having a spinel structure, and lithium-containing composite metal oxide having an olivine structure.

Examples of the lithium-containing composite metal oxide having a layer structure may include lithium-containing cobalt oxide (LCO: $LiCoO_2$), lithium-containing nickel oxide ($LiNiO_2$), Co—Ni—Mn lithium composite oxide (NMC: $LiNi_{0.8}Co_{0.1}Mn_{0.1}O_2$, $LiNi_{0.33}Co_{0.33}Mn_{0.33}O_2$, etc.), Ni—Mn—Al lithium composite oxide, and Ni—Co—Al lithium composite oxide (NCA: $Li[Ni—Co—Al]O_2$, etc.).

Examples of the lithium-containing composite metal oxide having a spinel structure may include lithium manganate (LMO: $LiMn_2O_4$), and $Li[Mn_{3/2}M^1{}_{1/2}]O_4$ (wherein M is Cr, Fe, Co, Ni, Cu, etc.) obtained by substituting part of Mn in lithium manganate with another transition metal.

Examples of the lithium-containing composite metal oxide having an olivine structure may include an olivine-type lithium phosphate compound represented by $Li_xM^2PO_4$ (in the formula, $M^2$ represents at least one selected from the group consisting of Mn, Fe, Co, Ni, Cu, Mg, Zn, V, Ca, Sr, Ba, Ti, Al, Si, B, and Mo; and X represents a number satisfying $0 \leq X \leq 2$, such as LFP: $LiFePO_4$).

Examples of the positive electrode active material composed of organic compounds may include conductive polymer compounds such as polyacetylene and poly-p-phenylene.

Furthermore, a positive electrode active material containing a combination of an inorganic compound and an organic compound may also be used.

Furthermore, e.g., a composite material coated with carbon materials may be manufactured by reduction-firing iron-based oxide in the presence of carbon source substances, and this composite material may also be used as the positive electrode active material. Iron-based oxide tends to have poor electrical conductivity. However, when the iron-based oxide is formulated as the aforementioned composite material, it may be used as a high-performance positive electrode active material.

Furthermore, the aforementioned compounds may be subjected to partial element substitution, and the resultant may be used as the positive electrode active material.

Furthermore, a mixture of the aforementioned inorganic compound and organic compound may be used as the positive electrode active material.

As the positive electrode active material, one type thereof may be solely used, and two or more types thereof may also be used in combination at any ratio.

Particularly preferable examples of the positive electrode active material may include LCO, LMO, NMC, and NCA.

The volume average particle size D50 of the particles of the positive electrode active material is preferably 1 µm or more, and more preferably 2 µm or more, and is preferably 50 µm or less, and more preferably 30 µm or less. When the volume average particle size of the particles of the positive electrode active material falls within the aforementioned range, the amount of the binder in the positive electrode active material layer can be reduced, and reduction in capacity of the lithium ion secondary battery can be suppressed. Furthermore, viscosity of the slurry composition can be easily adjusted to an optimum viscosity that facilitates coating. Accordingly, a uniform positive electrode can be obtained.

The amount of the positive electrode active material, in terms of the ratio of the positive electrode active material in the electrode active material layer, is preferably 90% by weight or more, and more preferably 95% by weight or more, and is preferably 99.9% by weight or less, and more preferably 99% by weight or less. When the amount of the positive electrode active material falls within the aforementioned range, the lithium ion secondary battery can have high capacity, and flexibility of the positive electrode and the binding property between the current collector and the positive electrode active material layer can be improved.

The electrode active material for negative electrodes (when appropriate, this may be referred to hereinbelow as the "negative electrode active material"), among the electrode active materials, is a substance that transfers electrons at a negative electrode. As the negative electrode active material, a substance that can store and release lithium ions is usually used.

Preferable examples of the negative electrode active material may include carbon. Examples of carbon may include naturally-occurring graphite, artificial graphite, and carbon black. Among these, naturally-occurring graphite is preferably used.

As the negative electrode active material, it is also preferable to use a negative electrode active material that contains at least one selected from the group consisting of tin, silicon, germanium, and lead. The negative electrode active material containing these elements has small irreversible capacity. Among these, the negative electrode active material containing silicon is preferable. The use of the negative electrode active material containing silicon can enhance electrical capacity of the lithium ion secondary battery.

As the negative electrode active material, one type thereof may be solely used, and two or more types thereof may also be used in combination at any ratio. Therefore, two or more types of the aforementioned negative electrode active materials may be used in combination. Among these, a negative electrode active material that contains a combination of carbon, and one or both of metal silicon and a silicon-based active substance is preferably used. In the negative electrode active material that contains a combination of carbon, and one or both of metal silicon and a silicon-based active substance, it is estimated that Li is intercalated into and deintercalated from one or both of metal silicon and a silicon-based active substance at a high electrical potential, while Li is intercalated into and deintercalated from carbon at a low electrical potential. For this reason, expansion and contraction are suppressed, thereby enabling improvement in cycle property of the lithium ion secondary battery.

Examples of the silicon-based active substance may include SiO, $SiO_2$, $SiO_x$ ($0.01 \leq x < 2$), SiC, and SiOC. Among these, $SiO_x$, SiC, and SiOC are preferable. Among these, $SiO_x$ is particularly preferably used as the silicon-based active substance, because swelling of the negative electrode active material itself is suppressed. $SiO_x$ is a compound that is formed with one or both of SiO and $SiO_2$ and metal silicon as raw materials. This $SiO_x$ may be manufactured by, e.g., cooling and precipitating a silicon monoxide gas generated by heating a mixture of $SiO_2$ and metal silicon.

When a combination of carbon and one or both of metal silicon and a silicon-based active substance is used, it is preferable that the one or both of metal silicon and a silicon-based active substance are formulated as a composite with conductive carbon. The use of such a composite including conductive carbon enables suppression of swelling of the negative electrode active material itself.

Examples of the method for obtaining the composite may include: a method of coating one or both of metal silicon and a silicon-based active substance with carbon to obtain the composite; and a method of granulating a mixture containing conductive carbon and one or both of metal silicon and a silicon-based active substance to obtain the composite.

Examples of the method for coating one or both of metal silicon and a silicon-based active substance with carbon may include: a method of heat treating one or both of metal silicon and a silicon-based active substance for disproportionation; and a method of heat treating one or both of metal silicon and a silicon-based active substance for chemical vapor deposition.

The volume average particle size D50 of the particles of the negative electrode active material is appropriately selected considering other structural requirements of the lithium ion secondary battery. The D50 is preferably 0.1 μm or more, more preferably 1 μm or more, and further preferably 5 μm or more, and is preferably 100 μm or less, more preferably 50 μm or less, and further preferably 20 μm or less.

The specific surface area of the negative electrode active material is, from the viewpoint of power density, preferably 2 $m^2/g$ or more, more preferably 3 $m^2/g$ or more, and further preferably 5 $m^2/g$ or more, and is preferably 20 $m^2/g$ or less, more preferably 15 $m^2/g$ or less, and further preferably 10 $m^2/g$ or less. The specific surface area of the negative electrode active material may be measured by, e.g., a BET method.

The amount of the negative electrode active material in terms of the ratio of the negative electrode active material in the electrode active material layer is preferably 85% by weight or more, and more preferably 88% by weight or more, and is preferably 99% by weight or less, and more preferably 97% by weight or less. When the amount of the negative electrode active material falls within the aforementioned range, the negative electrode can have excellent flexibility and binding property while exhibiting high capacity.

<2.2. Ratio of Binder Composition in Slurry Composition>

It is preferable that the ratio of the binder composition contained in the slurry composition is appropriately adjusted so that the performance of the obtained battery is favorably expressed. For example, the ratio of the solid content of the binder composition relative to 100 parts by weight of the electrode active material is preferably 0.1 parts by weight or more, more preferably 0.5 parts by weight or more, and particularly preferably 1 part by weight or more, and is preferably 10 parts by weight or less, more preferably 8 parts by weight or less, and particularly preferably 5 parts by weight or less.

<2.3. Optional Components>

The slurry composition may include an optional component other than the aforementioned electrode active material and binder composition.

For example, it is preferable that the slurry composition includes carboxymethyl cellulose salt. Carboxymethyl cellulose salt acts as a thickening agent in the slurry composition. Therefore, carboxymethyl cellulose salt can increase viscosity of the slurry composition. Thus, the slurry composition can have favorable coating property. Furthermore, usually, carboxymethyl cellulose salt can enhance dispersion stability of the particles of the electrode active material, etc. in the slurry composition, and also can enhance binding property between the electrode active material layer and the current collector. Examples of carboxymethyl cellulose salt may include sodium salt and ammonium salt. As the carboxymethyl cellulose salt, one type thereof may be solely used, and two or more types thereof may also be used in combination at any ratio.

The amount of carboxymethyl cellulose salt relative to 100 parts by weight of the electrode active material is preferably 0.1 parts by weight or more, more preferably 0.3 parts by weight or more, and particularly preferably 0.5 parts by weight or more, and is preferably 5 parts by weight or less, more preferably 4 parts by weight or less, and particularly preferably 3 parts by weight or less. When the amount of carboxymethyl cellulose salt falls within the aforementioned range, particles in the slurry composition can have further better dispersibility, thereby effectively improving cycle property of the lithium ion secondary battery.

The slurry composition may further additionally include, e.g., a solvent such as water, in addition to the solvent contained in the binder composition. The amount of the solvent is preferably adjusted so that the slurry composition can have a viscosity suitable for coating. Specifically, the amount of the solvent is adjusted so that the concentration of the solid content of the slurry composition is preferably 30% by weight or more, and more preferably 35% by weight or more, and is preferably 70% by weight or less, and more preferably 65% by weight or less. The solid content of the slurry composition herein means a substance that remains as a constituent component of the electrode active material layer after drying of the slurry composition.

The slurry composition may also include, e.g., a conductive material. The conductive material is a component that can improve electrical contact between the electrode active materials. The inclusion of the conductive material can improve discharge rate property of the lithium ion secondary battery.

Examples of the conductive material may include conductive carbon such as furnace black, acetylene black, Ketjen black, oil furnace black, carbon black, graphite, vapor-phase grown carbon fiber, and carbon nanotube. Among these, since a good balance is achieved between low temperature output property and life property of the lithium ion secondary battery, acetylene black, oil furnace black, and Ketjen black are preferable, and acetylene black and Ketjen black are particularly preferable. As the conductive material, one type thereof may be solely used, and two or more types thereof may also be used in combination at any ratio.

The specific surface area of the conductive material is preferably 50 $m^2/g$ or more, more preferably 60 $m^2/g$ or more, and particularly preferably 70 $m^2/g$ or more, and is preferably 1500 $m^2/g$ or less, more preferably 1200 $m^2/g$ or less, and particularly preferably 1000 $m^2/g$ or less. When the specific surface area of the conductive material is equal to or more than the lower limit of the aforementioned range, the lithium ion secondary battery can have improved low temperature output property. When the specific surface area thereof is equal to or less than the upper limit, binding property between the electrode active material layer and the current collector can be enhanced.

The amount of the conductive material relative to 100 parts by weight of the electrode active material is preferably 0.1 parts by weight or more, more preferably 0.2 parts by weight or more, and further preferably 0.3 parts by weight or more, and is preferably 10 parts by weight or less, more preferably 8 parts by weight or less, and further preferably 5 parts by weight or less. When the amount of the conductive material is equal to or more than the aforementioned lower limit, the lithium ion secondary battery can have improved low temperature output property. When the amount thereof is equal to or less than the upper limit, binding property between the electrode active material layer and the current collector can be enhanced.

The slurry composition may further include, e.g., a reinforcing material. With the use of the reinforcing material, the electrode having toughness and flexibility can be obtained, and excellent long-term cycle property can be realized. Examples of the reinforcing material may include a variety of inorganic and organic fillers in a shape of spherical, plate-like, rod-like or fibrous form. As the reinforcing material, one type thereof may be solely used, and two or more types thereof may also be used in combination at any ratio.

The amount of the reinforcing material relative to 100 parts by weight of the electrode active material is preferably 0.01 parts by weight or more, and more preferably 1 part by weight or more, and is preferably 20 parts by weight or less, and more preferably 10 parts by weight or less. When the amount of the reinforcing material falls within the aforementioned range, the lithium ion secondary battery can have high capacity and high load property.

The slurry composition may further include, e.g., an electrolytic solution additive. The use of the electrolytic solution additive can, e.g., suppress decomposition of the electrolytic solution. Examples of the electrolytic solution additive may include vinylene carbonate. As the electrolytic solution additive, one type thereof may be solely used, and two or more types thereof may also be used in combination at any ratio.

The amount of the electrolytic solution additive relative to 100 parts by weight of the electrode active material is preferably 0.01 parts by weight to 10 parts by weight. When the amount of the electrolytic solution additive falls within the aforementioned range, a secondary battery having excellent cycle property and high temperature property can be achieved.

The slurry composition may further include, e.g., nanoparticles such as fumed silica and fumed alumina. With the nanoparticles as the constituent, thixotropic property of the slurry composition can be adjusted. Therefore, leveling property of the resulting electrode active material layer can thereby be improved. As the nanoparticle, one type thereof may be solely used, and two or more types thereof may also be used in combination at any ratio.

The amount of the nanoparticles relative to 100 parts by weight of the electrode active material is preferably 0.01 parts by weight to 10 parts by weight. When the amount of the nanoparticles falls within the aforementioned range, the slurry composition can have improved stability and productivity, thereby achieving high battery property.

<2.4. Method for Manufacturing Slurry Composition>

The slurry composition according to the present invention may be manufactured by, e.g., mixing the electrode active material, the binder composition, and if necessary, optional components. The specific procedure for manufacturing the slurry composition may be in any order. When the slurry composition to be manufactured contains the electrode active material, the binder composition, water, the thickening agent, and the conductive material, examples of the manufacturing method may include: a method including adding and mixing the electrode active material, the binder composition, the thickening agent, and the conductive material into water at the same time; and a method including adding and mixing the electrode active material, the conductive material, and the thickening agent into water, and then adding and mixing the binder composition into the obtained mixture.

Examples of the apparatus for mixing may include mixers such as a ball mill, a sand mill, a bead mill, a roll mill, a pigment disperser, a kneader, an ultrasonic disperser, a homogenizer, a homomixer, and a planetary mixer.

[3. Electrode for Lithium Ion Secondary Batteries]

The electrode for lithium ion secondary batteries according to the present invention includes a current collector and an electrode active material layer.

<3.1. Current Collector>

As the material for the current collector, a material that is electrically conductive and electrochemically durable may be used. As the material for the current collector, a metal material is usually used. Examples of the metal material may include iron, copper, aluminum, nickel, stainless steel, titanium, tantalum, gold, and platinum. Among these, aluminum is preferable as the current collector for positive electrodes, and copper is preferable as the current collector for negative electrodes. As the aforementioned material, one type thereof may be solely used, and two or more types thereof may also be used in combination at any ratio.

The shape of the current collector is not particularly limited, but is preferably a sheet-like shape having a thickness of approximately 0.001 mm to 0.5 mm.

It is preferable that the surface of the current collector is previously subjected to a roughening treatment for increasing adhesion strength with the electrode active material layer. Examples of the roughening method may include mechanical polishing, electrolytic polishing, and chemical polishing. In the mechanical polishing, e.g., coated abrasives including fixed abrasive particles, grindstone, emery wheel, and wire brush with steel wire are used. For increasing adhesion strength and conductivity of the electrode active material layer, an intermediate layer may be formed on the surface of the current collector.

<3.2. Electrode Active Material Layer>

The electrode active material layer is a layer obtained by applying the slurry composition onto the current collector and drying the slurry composition. Therefore the electrode active material layer is a layer formed with the solid content of the slurry composition according to the present invention. That is, the electrode active material layer includes the electrode active material, the particulate polymer, and the water-soluble polymer.

For manufacturing the electrode active material layer, the slurry composition is applied onto the current collector to form a layer of the slurry composition. The slurry composition may be applied onto one side of the current collector, and may also be applied onto both sides of the current collector.

The application method is not limited. Examples thereof may include a doctor blade method, a dipping method, a reverse roll method, a direct roll method, a gravure method, an extrusion method, and a brushing method.

The thickness of the layer of the slurry composition may be appropriately set in conformity with the thickness of the intended electrode active material layer.

After the layer of the slurry composition has been formed, liquid such as the solvent is removed from this layer by drying. The electrode active material layer containing the solid content of the slurry composition is thereby formed on the surface of the current collector. Thus, an electrode is obtained.

Examples of the drying method may include drying with air such as warm air, hot air, and low moisture air; vacuum drying; and drying by irradiation with energy rays such as infrared rays, far infrared rays, or electron beams. Among these, drying by irradiation with far infrared rays is preferable.

It is preferable that the drying temperature and drying time are set to the temperature and time with which the solvent can be removed from the layer of the slurry composition. Specifically, the drying time is usually 1 minute to 30 minutes, and the drying temperature is usually 40° C. to 180° C.

After the layer of the slurry composition has been dried, if necessary, the electrode active material layer is preferably subjected to a pressurization treatment by, e.g., mold press and roll press. By the pressurization treatment, porosity of the electrode active material layer can be reduced. The porosity is preferably 5% or more, and more preferably 7% or more, and is preferably 30% or less, and more preferably 20% or less. When the porosity is equal to or more than the lower limit of the aforementioned range, high volumetric capacity can be easily obtained, whereby the electrode active material layer can be less prone to be peeled off from the current collector. When the porosity is equal to or less than the upper limit, high charge efficiency and discharge efficiency can be obtained.

Furthermore, when the electrode active material layer contains a polymer that is curable by curing reaction such as crosslinking reaction, the polymer may be cured after the formation of the electrode active material layer by, e.g., heat treatment.

The thickness of the electrode active material layer may be optionally set in conformity with required battery performance.

For example, the thickness of the positive electrode active material layer is preferably 5 μm or greater, and more preferably 10 μm or greater, and is preferably usually 300 μm or smaller, and more preferably 250 μm or smaller. When the thickness of the positive electrode active material layer falls within the aforementioned range, both high load property and high energy density can be achieved.

For example, the thickness of the negative electrode active material layer is preferably 5 μm or greater, more preferably 20 μm or greater, and particularly preferably 30 μm or greater, and is preferably 1000 μm or smaller, more preferably 500 μm or smaller, further preferably 300 μm or smaller, and particularly preferably 250 μm or smaller. When the thickness of the negative electrode active material layer falls within the aforementioned range, load property and cycle property can be made favorable.

[4. Lithium Ion Secondary Battery]

The lithium ion secondary battery according to the present invention includes a positive electrode, a negative electrode, and an electrolytic solution. The lithium ion secondary battery according to the present invention may also include a separator. In the lithium ion secondary battery according to the present invention, the positive electrode, the negative electrode, or both the positive electrode and the negative electrode are the electrode according to the present invention.

In the lithium ion secondary battery according to the present invention, gas generation caused by charging and discharging can be suppressed. The reason why such an effect can be obtained is not necessarily identified. However, according to research by the present inventor, it is inferred that since the water-soluble polymer can trap halide ions in the electrolytic solution, gas generation caused by halide ions is suppressed. When halide ions are contained in a battery, the water-soluble polymer layer formed on the surface of the electrode active material is sometimes ruptured. When the water-soluble polymer layer is ruptured, the electrolytic solution and the SEI may be decomposed as the charging and discharging are performed. Such decomposition may cause gas generation. In contrast to this, when halide ions are trapped by the water-soluble polymer, such rupture of the water-soluble polymer layer is suppressed. It is considered that such suppression enables reduction of the gas generation amount.

Furthermore, the lithium ion secondary battery according to the present invention usually has favorable cycle property. The reason why such favorable cycle property can be achieved is not necessarily identified. However, according to research by the present inventor, it is inferred as follows. That is, firstly, the suppression of gas generation as described above can suppress reduction in battery capacity caused by the gas. Secondly, the trapping of halide ions in the electrolytic solution by the water-soluble polymer can prevent corrosion of the current collector caused by halide ions. Prevention of the corrosion of the current collector can suppress increase in electrode resistance caused by development of the corrosion. The prevention of the corrosion of the current collector can also suppress reduction in binding force between the current collector and the electrode active material layer. Thirdly, since the binder composition according to the present invention has an excellent ability of binding the current collector and the electrode active material, cutting of a conductive path caused by repeated charging and discharging can be suppressed. Therefore, it is inferred that a combination of these factors can lead to achievement of excellent cycle property.

<4.1. Electrolytic Solution>

As the electrolytic solution, e.g., a solution obtained by dissolving lithium salt as a supporting electrolyte in a non-aqueous solvent may be used. Examples of lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Especially, $LiPF_6$, $LiClO_4$, and $CF_3SO_3Li$, which are easily dissolved in a solvent and exhibit high dissociation degree, are suitably used. One type of them may be solely used, and two or more types thereof may also be used in combination at any ratio.

The amount of the supporting electrolyte is, in terms of the concentration in the electrolytic solution, preferably 1% by weight or more, and more preferably 5% by weight or more, and is preferably 30% by weight or less, and more preferably 20% by weight or less. When the amount of the supporting electrolyte falls within the aforementioned range, high ion conductivity can be obtained. Thus, the battery can have favorable charging property and discharging property.

As the solvent used in the electrolytic solution, a solvent in which the supporting electrolyte can be dissolved may be used. Examples of such a solvent may include: alkyl carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Especially, dimethyl carbonate, ethylene carbonate, propylene carbonate, diethyl carbonate, and methyl ethyl carbonate are preferable, because high ion conductivity is easily obtained, and the temperature range to be adopted is large. As the solvent, one type thereof may be solely used, and two or more types thereof may also be used in combination at any ratio.

If necessary, the electrolytic solution may also include additives. Preferable examples of the additives may include carbonate-based compounds such as vinylene carbonate (VC). As the additive, one type thereof may be solely used, and two or more types thereof may also be used in combination at any ratio.

<4.2. Separator>

As the separator, a porous substrate having a pore portion is usually used. Examples of the separator may include (a) a porous separator having a pore portion, (b) a porous separator including a polymer coat layer formed on one side or both sides thereof, (c) a porous separator including a porous resin coat layer containing inorganic ceramic powder formed thereon. Examples of these may include: polymer films for solid polymer electrolytes or gel-like polymer electrolytes, such as polypropylene-based, polyethylene-based, polyolefin-based, or aramid-based porous separators, polyvinylidene fluoride, polyethylene oxides, polyacrylonitrile, or polyvinylidene fluoride hexafluoropropylene copolymer; a separator coated with a gelled polymer coat layer; and a separator coated with a porous film layer including an inorganic filler and a dispersing agent for inorganic fillers.

<4.3. Source of Halide Ions>

As described above, in the lithium ion secondary battery according to the present invention, it is considered that the water-soluble polymer traps halide ions to thereby suppress gas generation. Examples of a component which is considered as a source of such halide ions may include the following substances.

Examples of a source of fluoride ions may include a supporting electrolyte of an electrolytic solution such as $LiPF_6$, $LiAsF_6$, $LiBF_4$, $LiSbF_6$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$; and a binder for an electrode such as polyvinylidene fluoride.

Examples of a source of chloride ions may include a supporting electrolyte of the electrolytic solution such as $LiAlCl_4$, $LiClO_4$; additives of the slurry composition such as carboxymethyl cellulose salt; and a residual HCl component of the electrode active material.

The lithium ion secondary battery according to the present invention is significant in that, even when the battery has a structure containing the aforementioned components that may generate halide ions, decrease in performance of the battery caused by halide ions can be suppressed.

<4.4. Method for Manufacturing Lithium Ion Secondary Battery>

The method for manufacturing the lithium ion secondary battery according to the present invention is not particularly limited. For example, the aforementioned negative electrode and positive electrode may be stacked via a separator, and the obtained stack may be, e.g., wound or folded into a battery shape, and placed in a battery container. Then, an electrolytic solution may be injected into the battery container, and the battery container may be sealed. Furthermore, expanded metal; an overcurrent prevention element such as fuse and PTC element; lead wire plates; etc. may be put in the battery container to prevent pressure increase inside the battery and excessive charging and discharging. The shape of the battery may be any of, e.g., laminate cell-type, coin-type, button-type, sheet-type, cylindrical-type, rectangle-type, and flat-type.

EXAMPLES

The present invention will be specifically described hereinbelow with reference to Examples. However, the present invention is not limited to the following Examples, and may optionally be modified without departing from the scope of the claims and equivalents thereto.

Unless otherwise stated, "%" and "parts" indicating quantity in the following description are based on weight. Unless otherwise stated, the following operations were performed under the conditions of normal temperature and normal pressure.

[Evaluation Methods]

(1. Method for Measuring Cell Volume Change)

A lithium ion secondary battery of an 800 mAh wound-type cell manufactured in Examples and Comparative Examples was left to stand under the environment of 25° C. for 24 hours. Thereafter, a charging and discharging operation of charging at 0.1 C up to 4.35 V and discharging at 0.1 C down to 2.75 V under the environment of 25° C. was performed. Thereafter, the wound-type cell was immersed in liquid paraffin, and its volume V0 was measured.

Furthermore, the charging and discharging operation was repeated by 1000 cycles under the environment of 60° C. in the same conditions as the aforementioned conditions. Thereafter, the wound-type cell was immersed in liquid paraffin, and its volume V1 was measured.

Volume change amount $\Delta V$ of the wound-type cell before and after 1000 cycles of charging and discharging was calculated by "$\Delta V=(V1-V0)/V0\times 100(\%)$". Smaller value of this volume change amount $\Delta V$ is indicative of better ability of suppressing gas generation.

(2. Method for Measuring Peel Strength after Pressing)

Electrodes manufactured in Examples and Comparative Examples (the negative electrode in Examples 1 to 15 and Comparative Examples 1 to 5, and the positive electrode in Example 16) were each cut out in a shape of rectangle having a length of 100 mm and a width of 10 mm, to obtain a test sample. A cellophane tape was attached to the surface of the electrode active material layer of this test sample with the surface of the electrode active material layer facing downward. As the cellophane tape, the one defined in JIS Z1522 was used. The cellophane tape was previously fixed to a horizontal test board. Thereafter, one end of the current collector was pulled vertically upward at a pulling speed of 50 mm/min, to peel off the current collector, and the stress upon the peeling was measured. This measurement was performed three times, and an average value thereof was calculated. This average value was defined as peel strength Sp1. Higher peel strength Sp1 is indicative of stronger the binding force of the electrode active material layer to the current collector, i.e., higher adhesion strength.

(3. Method for Evaluating High-Temperature Cycle Property)

Lithium ion secondary batteries of an 800 mAh wound-type cell manufactured in Examples and Comparative Examples were left to stand under the environment of 25° C. for 24 hours. Thereafter, a charging and discharging operation of charging at 0.1 C up to 4.35 V and discharging at 0.1 C down to 2.75 V under the environment of 25° C. was performed, and initial capacity C0 was measured.

The charging and discharging operation was further repeated by 1000 cycles under the environment of 60° C. in the same conditions as the aforementioned conditions. Then, capacity C1 after the 1000 cycles of charging and discharging was measured.

Capacity maintenance ratio $\Delta C$ was calculated by "$\Delta C=C1/C0\times 100(\%)$". Higher value of this capacity maintenance ratio $\Delta C$ is indicative of better high-temperature cycle of the lithium ion secondary battery, and longer battery life.

(4. Method for Measuring Peel Strength after Cycle Test)

After having measured the capacity maintenance ratio $\Delta C$, which has been described in the aforementioned item (3. Method for Evaluating High-Temperature Cycle Property), the lithium ion secondary battery of a wound-type cell was disassembled. The electrode of the disassembled battery (the negative electrode in Examples 1 to 15 and Comparative Examples 1 to 5, and the positive electrode in Example 16) was washed with an electrolytic solution solvent (EC/DEC/VC=68.5/30/1.5 volume ratio), and then dried under reduced pressure at a temperature of 60° C. and a negative pressure environment of −0.05 MPa for 10 hours. The dried electrode was cut out in a shape of rectangle having a length of 100 mm and a width of 10 mm, to obtain a test sample.

A cellophane tape was attached to the surface of the electrode active material layer of this test sample with the surface of the electrode active material layer facing downward. As the cellophane tape, the one defined in JIS Z1522 was used. The cellophane tape was previously fixed to a horizontal test board. Thereafter, one end of the current collector was pulled vertically upward at a pulling speed of 50 mm/min, to peel off the current collector, and the stress upon the peeling was measured. This measurement was performed three times, and an average value thereof was calculated. The average value was defined as peel strength Sp2 after cycle test. Higher peel strength Sp2 is indicative of stronger binding force of the electrode active material layer to the current collector, i.e., higher adhesion strength.

(5. Method for Measuring Weight Average Molecular Weight of Water-Soluble Polymer)

The weight average molecular weight of the water-soluble polymer was measured by GPC (gel permeation chromatography) under the following conditions.

Measurement apparatus: GPC (Model No.: HLC-8220) manufactured by Tosoh Corporation Molecular weight column: Connected four columns, TSKgel SuperHZM-M (manufactured by Tosoh Corporation)

Eluent: Solution of 0.85 g/mL sodium nitrate dissolved in 10% by volume aqueous dimethylformamide solution Flow rate: 0.6 mL/min Injection amount: 20 L Column temperature: 40° C.

Detector: Differential refractive index detector RI (HLC-8320 GPC RI detector manufactured by Tosoh Corporation)

Reference material: Polystyrene

Measurement method: An aqueous solution of the water-soluble polymer manufactured in each of Examples and Comparative Examples was poured in a silicon container so that the dried thickness becomes 1 mm, and dried at room temperature for 72 hours, to prepare a film having a 1 cm×1 cm square shape. This film was dissolved in dimethylformamide to prepare a 1% solution. This solution was used as a test sample for GPC measurement.

Example 1

1-1. Manufacture of Water-Soluble Polymer

Into a 5 MPa pressure resistant container equipped with a stirrer, 0.8 parts of acrylamide (carboxylic acid amide monomer), 32.5 parts of methacrylic acid (ethylenically unsaturated carboxylic acid monomer), 7.5 parts of 2,2,2-trifluoroethyl methacrylate (fluorine-containing (meth)acrylic acid ester monomer), 57.2 parts of ethyl acrylate (optional monomer), 0.8 parts of ethylene dimethacrylate (crosslinkable monomer), 1.2 parts of polyoxyalkylene alkenyl ether ammonium sulfate (reactive surfactant), 0.6 parts of t-dodecyl mercaptan, 150 parts of ion exchanged water, and 1.0 part of potassium persulfate (polymerization initiator) were charged. The mixture was sufficiently stirred, and thereafter heated to 60° C. to initiate polymerization. When the polymerization conversion ratio reached 96%, the mixture was cooled to terminate the reaction. Thus, a mixture containing a water-soluble polymer was obtained. To the aforementioned mixture containing the water-soluble polymer, 10% ammonia water was added for adjusting the pH to 8. Accordingly, the water-soluble polymer was dissolved in water, and a desired aqueous solution containing a water-soluble polymer was obtained.

1-2. Manufacture of Particulate Polymer

Into a 5 MPa pressure resistant container equipped with a stirrer, 33.0 parts of 1,3-butadiene, 3.5 parts of itaconic acid (ethylenically unsaturated carboxylic acid monomer), 62.5 parts of styrene, 1 part of 2-hydroxyethyl acrylate, 0.4 parts of sodium dodecylbenzenesulfonate as an emulsifier, 150 parts of ion exchanged water, and 0.5 parts of potassium persulfate as an polymerization initiator were charged. The mixture was sufficiently stirred, and thereafter heated to 50° C. to initiate polymerization. When the polymerization conversion ratio reached 96%, the mixture was cooled to terminate the reaction. Thus, a mixture containing a particulate polymer (SBR) was obtained. To the aforementioned mixture containing the particulate polymer, a 5% aqueous sodium hydroxide solution was added for adjusting the pH to 8. Thereafter, unreacted monomers were removed from the mixture by heat vacuum distillation. Then, the mixture was cooled to 30° C. or lower. Thus, a desired aqueous dispersion liquid containing a particulate polymer was obtained.

1-3. Manufacture of Binder Composition for Secondary Battery Electrodes

In a container, 95 parts in terms of solid content of the aqueous dispersion liquid containing the particulate polymer produced in the aforementioned step (1-2), and 0.25 parts of sodium dioctyl succinate were mixed. Thereafter, the aqueous solution containing the water-soluble polymer produced in the aforementioned step (1-1) was further mixed in an amount of 5 parts in terms of solid content. Water was mixed with the resultant product for adjusting the concentration. Thus, a binder composition for electrodes having a solid content concentration of 25% was obtained.

1-4. Manufacture of Slurry Composition for Negative Electrodes

In a planetary mixer equipped with a disper, 100 parts of naturally-occurring graphite ("FSN" manufactured by Shanghai Shanshan Tech Co., Ltd., volume average particle size: 15.6 μm) having a specific surface area of 5.5 m²/g as a negative electrode active material, and 1.0 part in terms of solid content of a 2% aqueous solution of carboxymethyl cellulose salt ("MAC-350HC" manufactured by Nippon Paper Industries Co., Ltd.) as a thickening agent were mixed. The mixture was further adjusted to a solid content concentration of 60% with ion exchanged water. Thereafter, the product was mixed at 25° C. for 60 minutes. Then, the mixture was adjusted to a solid content concentration of 52% with ion exchanged water. Thereafter, the product was further mixed at 25° C. for 15 minutes to obtain a mixed liquid. To this mixed liquid, 2.0 parts in terms of solid content of the binder composition for electrodes manufactured in the aforementioned step (1-3) was added. Ion exchanged water was further added for concentration adjustment such that the final solid content concentration becomes 48%. Then, the product was mixed for 10 minutes. This mixture was subjected to a defoaming treatment under reduced pressure. Thus, a slurry composition for negative electrodes having good fluidity was obtained.

1-5. Manufacture of Negative Electrode

The slurry composition for negative electrodes obtained in the aforementioned step (1-4) was applied with a comma coater onto a copper foil having a thickness of 20 m as a current collector such that the film thickness after drying becomes approximately 150 μm, and then dried. This drying was performed by conveying the copper foil at a speed of 0.5 m/min in an oven at 60° C. over 2 minutes. Thereafter, the dried product was heated at 120° C. for 2 minutes to obtain a negative electrode master film before pressing. This negative electrode master film before pressing was rolled with a roll press. Thus, a pressed negative electrode including a negative electrode active material layer having a thickness of 80 μm was obtained.

As to this negative electrode, peel strength Sp1 between the electrode active material layer and the current collector was measured in accordance with the aforementioned procedure.

1-6. Manufacture of Slurry Composition for Positive Electrodes 100 parts of $LiCoO_2$ having a volume average particle size of 12 μm as a positive electrode active material, 2 parts of acetylene black ("HS-100" manufactured by Denki Kagaku Kogyo Kabushiki Kaisha) as a conductive material, and 2 parts in terms of solid content of polyvinylidene fluoride (#7208 manufactured by Kureha Corporation) as a binder were mixed. Furthermore, N-methylpyrrolidone was added for adjusting the total solid content concentration to 70%. They were mixed in a planetary mixer to obtain a slurry composition for positive electrodes.

1-7. Manufacture of Positive Electrode

The slurry composition for positive electrodes obtained in the aforementioned step (1-6) was applied with a comma coater onto an aluminum foil having a thickness of 20 μm as a current collector such that the film thickness after drying becomes approximately 150 μm, and then dried. This drying was performed by conveying the aluminum foil at a speed of 0.5 m/min in an oven at 60° C. over 2 minutes. Thereafter, the dried product was heated at 120° C. for 2 minutes to obtain a positive electrode.

1-8. Preparation of Separator

A single-layer polypropylene separator ("Celgard 2500" manufactured by Celgard Inc.) was cut out in a shape of 5×5 cm² square.

1-9. Manufacture of Lithium Ion Secondary Battery

As the exterior package of a battery, an aluminum exterior package was prepared. The positive electrode obtained in the aforementioned step (1-7) was cut out in a shape of a 4.6×4.6 cm² square, and disposed such that the surface on the current collector side is brought into contact with the aluminum exterior package. The square separator obtained in the aforementioned step (1-8) was disposed on the surface of the positive electrode active material layer of the positive electrode. Furthermore, the pressed negative electrode obtained in the aforementioned step (1-5) was cut out in a shape of a 5×5 cm² square, and disposed on the separator such that the surface on the negative electrode active material layer side faces the separator. An electrolytic solution (solvent: EC/DEC/VC=68.5/30/1.5 volume ratio, electrolyte: $LiPF_6$ at a concentration of 1M) was injected such that air was not left. Furthermore, for sealing the opening of the aluminum package, heat sealing was performed at 150° C. to close the opening of the aluminum package. Thus a lithium ion secondary battery was obtained.

As to this lithium ion secondary battery, cell volume change amount ΔV, capacity maintenance ratio ΔC, and peel strength Sp2 after cycle test were measured in accordance with the aforementioned procedures.

Example 2

In the aforementioned step (1-1), the amount of acrylamide was changed to 0.1 parts, and the amount of ethyl acrylate was changed to 57.9 parts.

A lithium ion secondary battery was manufactured and evaluated in the same manner as in Example 1 except for the aforementioned matters.

Example 3

In the aforementioned step (1-1), the amount of acrylamide was changed to 9.5 parts, and the amount of ethyl acrylate was changed to 48.5 parts.

A lithium ion secondary battery was manufactured and evaluated in the same manner as in Example 1 except for the aforementioned matters.

Example 4

In the aforementioned step (1-1), methacrylamide was used in place of acrylamide.

A lithium ion secondary battery was manufactured and evaluated in the same manner as in Example 1 except for the aforementioned matter.

Example 5

In the aforementioned step (1-1), N,N-dimethylaminoethyl acrylamide (N-2-dimethylaminoethyl acrylamide) was used in place of acrylamide.

A lithium ion secondary battery was manufactured and evaluated in the same manner as in Example 1 except for the aforementioned matter.

Example 6

In the aforementioned step (1-1), N,N-dimethylaminopropyl acrylamide (N-3-dimethylaminopropyl acrylamide) was used in place of acrylamide.

A lithium ion secondary battery was manufactured and evaluated in the same manner as in Example 1 except for the aforementioned matter.

Example 7

In the aforementioned step (1-1), the amount of methacrylic acid was changed to 22 parts, and the amount of ethyl acrylate was changed to 67.7 parts.

A lithium ion secondary battery was manufactured and evaluated in the same manner as in Example 1 except for the aforementioned matters.

Example 8

In the aforementioned step (1-1), the amount of methacrylic acid was changed to 82 parts, and the amount of ethyl acrylate was changed to 7.7 parts.

A lithium ion secondary battery was manufactured and evaluated in the same manner as in Example 1 except for the aforementioned matters.

Example 9

In the aforementioned step (1-1), glycidyl methacrylate was used in place of ethylene dimethacrylate.

A lithium ion secondary battery was manufactured and evaluated in the same manner as in Example 1 except for the aforementioned matter.

Example 10

In the aforementioned step (1-1), ethylene glycol dimethacrylate was used in place of ethylene dimethacrylate.

A lithium ion secondary battery was manufactured and evaluated in the same manner as in Example 1 except for the aforementioned matter.

Example 11

In the aforementioned step (1-1), the amount of ethylene dimethacrylate was changed to 0.15 parts, and the amount of ethyl acrylate was changed to 57.85 parts.

A lithium ion secondary battery was manufactured and evaluated in the same manner as in Example 1 except for the aforementioned matters.

Example 12

In the aforementioned step (1-1), the amount of ethylene dimethacrylate was changed to 1.8 parts, and the amount of ethyl acrylate was changed to 56.2 parts.

A lithium ion secondary battery was manufactured and evaluated in the same manner as in Example 1 except for the aforementioned matters.

Example 13

In the aforementioned step (1-1), 2,2,2-trifluoroethyl methacrylate was not used, and the amount of ethyl acrylate was changed to 64.7 parts.

A lithium ion secondary battery was manufactured and evaluated in the same manner as in Example 1 except for the aforementioned matters.

Example 14

In the aforementioned step (1-3), the amount of the aqueous dispersion liquid containing the particulate polymer in terms of solid content was changed to 98.5 parts, and the amount of the aqueous solution containing the water-soluble polymer in terms of solid content was changed to 1.5 parts.

A lithium ion secondary battery was manufactured and evaluated in the same manner as in Example 1 except for the aforementioned matters.

Example 15

In the aforementioned step (1-3), the amount of the aqueous dispersion liquid containing the particulate polymer in terms of solid content was changed to 72 parts, and the amount of the aqueous solution containing the water-soluble polymer in terms of solid content was changed to 28 parts.

A lithium ion secondary battery was manufactured and evaluated in the same manner as in Example 1 except for the aforementioned matters.

Example 16

16-1. Manufacture of Particulate Binder

Into a 5 MPa pressure resistant container equipped with a stirrer, 76.0 parts of 2-ethylhexyl acrylate, 4.0 parts of itaconic acid (ethylenically unsaturated carboxylic acid monomer), 20 parts of acrylonitrile, 0.4 parts of sodium dodecylbenzenesulfonate as an emulsifier, 150 parts of ion exchanged water, and 0.5 parts of potassium persulfate as an polymerization initiator were charged. The mixture was sufficiently stirred, and thereafter heated to 50° C. to initiate polymerization. When the polymerization conversion ratio reached 96%, the mixture was cooled to terminate the reaction. Thus, a mixture containing a particulate polymer (ACL) was obtained. To the aforementioned mixture containing the particulate polymer, a 5% aqueous sodium hydroxide solution was added for adjusting the pH to 8. Thereafter, unreacted monomers were removed from the mixture by heat vacuum distillation. Then, the mixture was cooled to 30° C. or lower. Thus, a desired aqueous dispersion liquid containing a particulate polymer was obtained.

16-2. Manufacture of Binder Composition for Secondary Battery Electrodes

In a container, 95 parts in terms of solid content of the aqueous dispersion liquid containing the particulate polymer produced in the aforementioned step (16-1), and 0.25 parts of sodium dioctyl succinate were mixed. Thereafter, 5 parts in terms of solid content of the aqueous solution containing the water-soluble polymer produced in the step (1-1) of Example 1 was further mixed. Water was mixed with the resultant product for adjusting the concentration. Thus, a binder composition for electrodes having a solid content concentration of 25% was obtained.

16-3. Manufacture of Slurry Composition for Positive Electrodes 100 parts of $LiCoO_2$ having a volume average particle size of 12 μm as a positive electrode active material, 2 parts of acetylene black ("HS-100" manufactured by Denki Kagaku Kogyo Kabushiki Kaisha) as a conductive material, 1 part of sodium carboxymethyl cellulose salt ("MAC-350HC" manufactured by Nippon Paper Industries Co., Ltd.) as a thickening agent, and 2 parts in terms of solid content of the binder composition for electrodes produced in the aforementioned step (16-2) were mixed. Water was further added for adjusting the total solid content concentration to 65%. They were mixed in a planetary mixer to obtain a slurry composition for positive electrodes.

16-4. Manufacture of Positive Electrode

A positive electrode was manufactured in the same manner as the step (1-7) of Example 1, except that the slurry composition for positive electrodes obtained in the aforementioned step (16-3) was used as the slurry composition for positive electrodes.

As to this positive electrode, peel strength Sp1 between the electrode active material layer and the current collector was measured in accordance with the aforementioned procedure.

16-5. Manufacture of Slurry Composition for Negative Electrodes

A slurry composition for negative electrodes was manufactured in the same manner as the step (1-4) of Example 1, except that the aqueous dispersion liquid containing the particulate polymer produced in the step (1-2) of Example 1 was used in place of the binder composition for electrodes produced in the aforementioned step (1-3).

16-6. Manufacture of Negative Electrode

A negative electrode was manufactured in the same manner as the step (1-5) of Example 1, except that the slurry composition for negative electrodes obtained in the aforementioned step (16-5) was used as the slurry composition for negative electrodes.

16-7. Manufacture of Lithium Ion Secondary Battery

A lithium ion secondary battery was manufactured and evaluated in the same manner as the step (1-9) of Example 1, except that the positive electrode obtained in the aforementioned step (16-4) was used as the positive electrode, and the negative electrode obtained in the aforementioned step (16-6) was used as the negative electrode.

Comparative Example 1

In the aforementioned step (1-4), 2.0 parts in terms of solid content of the aqueous dispersion liquid containing the particulate polymer produced in the aforementioned step (1-2) was used in place of the binder composition for electrodes manufactured in the aforementioned step (1-3).

A lithium ion secondary battery was manufactured and evaluated in the same manner as in Example 1 except for the aforementioned matter.

Comparative Example 2

An aqueous dispersion liquid containing a particulate polymer was obtained in the same manner as the aforementioned step (1-2), except that a combination of 32.0 parts of 1,3-butadiene and 1.0 part of acrylamide was used in place of 33.0 parts of 1,3-butadiene.

In the aforementioned step (1-4), 2.0 parts in terms of solid content of the aqueous dispersion liquid containing the particulate polymer obtained in Comparative Example 2 was used in place of the binder composition for electrodes manufactured in the aforementioned step (1-3).

A lithium ion secondary battery was manufactured and evaluated in the same manner as in Example 1 except for the aforementioned matter.

Comparative Example 3

In the aforementioned step (1-1), acrylamide, 2,2,2-trifluoroethyl methacrylate, ethylene dimethacrylate, and polyoxyalkylene alkenyl ether ammonium sulfate were not used, the amount of methacrylic acid was changed to 35 parts, and the amount of ethyl acrylate was changed to 65 parts.

A lithium ion secondary battery was manufactured and evaluated in the same manner as in Example 1 except for the aforementioned matters.

Comparative Example 4

In the aforementioned step (1-1), 2,2,2-trifluoroethyl methacrylate, ethylene dimethacrylate, and polyoxyalkylene alkenyl ether ammonium sulfate were not used, the amount of acrylamide was changed to 0.05 parts, the amount of methacrylic acid was changed to 35 parts, and the amount of ethyl acrylate was changed to 64.95 parts.

A lithium ion secondary battery was manufactured and evaluated in the same manner as in Example 1 except for the aforementioned matters.

Comparative Example 5

In the aforementioned step (1-1), 2,2,2-trifluoroethyl methacrylate, ethylene dimethacrylate, and polyoxyalkylene alkenyl ether ammonium sulfate were not used, the amount of acrylamide was changed to 15 parts, the amount of methacrylic acid was changed to 35 parts, and the amount of ethyl acrylate was changed to 50 parts.

A lithium ion secondary battery was manufactured and evaluated in the same manner as in Example 1 except for the aforementioned matters.

[Results]

The results of the aforementioned Examples and Comparative Examples are shown in the following Table 1 to Table 5.

In the following Table 1 to Table 5, abbreviations mean as follows.

"monomer X": ethylenically unsaturated carboxylic acid monomer

"ST": styrene

"BD": 1,3-butadiene

"β-HEA": 2-hydroxyethyl acrylate

"2-EHA": 2-ethylhexyl acrylate

"AN": acrylonitrile

"IA": itaconic acid

"monomer I": carboxylic acid amide monomer

"AAm": acrylamide

"MAAm": methacrylamide

"DMAEAAm": N,N-dimethylaminoethyl acrylamide (N-2-dimethylaminoethyl acrylamide)

"DMAPAAm": N,N-dimethylaminopropyl acrylamide (N-3-dimethylaminopropyl acrylamide)

"monomer II": ethylenically unsaturated carboxylic acid monomer

"MAA": methacrylic acid

"monomer III": fluorine-containing (meth)acrylic acid ester monomer

"TFEMA": 2,2,2-trifluoroethyl methacrylate

"monomer IV": crosslinkable monomer

"EDMA": ethylene dimethacrylate

"GMA": glycidyl methacrylate

"EGDMA": ethylene glycol dimethacrylate

"monomer V": reactive surfactant

"PD-104": polyoxyalkylene alkenyl ether ammonium sulfate

"monomer VI": optional monomer

"EA": ethyl acrylate

"Mw": weight average molecular weight

"particulate:water": weight ratio between particulate polymer and water-soluble polymer "LCO": $LiCoO_2$ "CMC salt": salt of carboxymethyl cellulose "ΔV": volume change amount of battery "Sp1": peel strength between pressed current collector and electrode active material layer "ΔC": capacity maintenance ratio of battery "Sp2": peel strength between current collector and electrode active material layer after cycle test

TABLE 1

[Results of Examples 1 to 4]

| | | | Ex. 1 | Ex. 2 | Ex. 3 | Ex. 4 |
|---|---|---|---|---|---|---|
| Particulate polymer | Monomer | Type and amount | ST 62.5 BD 33 β-HEA 1 | ST 62.5 BD 33 β-HEA 1 | ST 62.5 BD 33 β-HEA 1 | ST 62.5 BD 33 β-HEA 1 |
| | Monomer X | Type | IA | IA | IA | IA |
| | | Amount (parts) | 3.5 | 3.5 | 3.5 | 3.5 |
| Water-soluble polymer | Monomer I | Type | AAm | AAm | AAm | MAAm |
| | | Amount (parts) | 0.80 | 0.10 | 9.50 | 0.80 |
| | Monomer II | Type | MAA | MAA | MAA | MAA |
| | | Amount (parts) | 32.5 | 32.5 | 32.5 | 32.5 |
| | Monomer III | Type | TFEMA | TFEMA | TFEMA | TFEMA |
| | | Amount (parts) | 7.5 | 7.5 | 7.5 | 7.5 |
| | Monomer IV | Type | EDMA | EDMA | EDMA | EDMA |
| | | Amount (parts) | 0.8 | 0.8 | 0.8 | 0.8 |
| | Monomer V | Type | PD-104 | PD-104 | PD-104 | PD-104 |
| | | Amount (parts) | 1.2 | 1.2 | 1.2 | 1.2 |
| | Monomer VI | Type | EA | EA | EA | EA |
| | | Amount (parts) | 57.2 | 57.9 | 48.5 | 57.2 |

TABLE 1-continued

[Results of Examples 1 to 4]

|  |  |  | Ex. 1 | Ex. 2 | Ex. 3 | Ex. 4 |
|---|---|---|---|---|---|---|
|  | Mw |  | 58400 | 61200 | 72800 | 48600 |
|  | Particulate:water |  | 95:5 | 95:5 | 95:5 | 95:5 |
| Active material |  |  | Graphite | Graphite | Graphite | Graphite |
| CMC salt |  |  | MAC350HC | MAC350HC | MAC350HC | MAC350HC |
| Gas suppression | ΔV |  | 21% | 31% | 22% | 23% |
| Adhesion | Sp1 | (N/m) | 18.5 | 17.9 | 20.3 | 17.4 |
| Cycle property | ΔC |  | 86.60% | 84.50% | 82.90% | 83.60% |
| Corrosion suppression | Sp2 | (N/m) | 10.5 | 9.5 | 8.2 | 9.3 |

TABLE 2

[Results of Examples 5 to 8]

|  |  |  | Ex. 5 | Ex. 6 | Ex. 7 | Ex. 8 |
|---|---|---|---|---|---|---|
| Particulate polymer | Monomer | Type and amount | ST 62.5<br>BD 33<br>β-HEA 1 | ST 62.5<br>BD 33<br>β-HEA 1 | ST 62.5<br>BD 33<br>β-HEA 1 | ST 62.5<br>BD 33<br>β-HEA 1 |
|  | Monomer X | Type | IA | IA | IA | IA |
|  |  | Amount (parts) | 3.5 | 3.5 | 3.5 | 3.5 |
| Water-soluble polymer | Monomer I | Type | DMAEAAm | DMAPAAm | AAm | AAm |
|  |  | Amount (parts) | 0.80 | 0.80 | 0.80 | 0.80 |
|  | Monomer II | Type | MAA | MAA | MAA | MAA |
|  |  | Amount (parts) | 32.5 | 32.5 | 22 | 82 |
|  | Monomer III | Type | TFEMA | TFEMA | TFEMA | TFEMA |
|  |  | Amount (parts) | 7.5 | 7.5 | 7.5 | 7.5 |
|  | Monomer IV | Type | EDMA | EDMA | EDMA | EDMA |
|  |  | Amount (parts) | 0.8 | 0.8 | 0.8 | 0.8 |
|  | Monomer V | Type | PD-104 | PD-104 | PD-104 | PD-104 |
|  |  | Amount (parts) | 1.2 | 1.2 | 1.2 | 1.2 |
|  | Monomer VI | Type | EA | EA | EA | EA |
|  |  | Amount (parts) | 57.2 | 57.2 | 67.7 | 7.7 |
|  | Mw |  | 37800 | 41500 | 78800 | 32100 |
|  | Particulate:water |  | 95:5 | 95:5 | 95:5 | 95:5 |
| Active material |  |  | Graphite | Graphite | Graphite | Graphite |
| CMC salt |  |  | MAC350HC | MAC350HC | MAC350HC | MAC350HC |
| Gas suppression | ΔV |  | 24.50% | 26% | 23% | 24% |
| Adhesion | Sp1 | (N/m) | 18.5 | 18.1 | 16.9 | 25.5 |
| Cycle property | ΔC |  | 83.20% | 80.60% | 84.10% | 81.80% |
| Corrosion suppression | Sp2 | (N/m) | 8.1 | 8.5 | 9.4 | 8.5 |

TABLE 3

[Results of Examples 9 to 12]

|  |  |  | Ex. 9 | Ex. 10 | Ex. 11 | Ex. 12 |
|---|---|---|---|---|---|---|
| Particulate polymer | Monomer | Type and amount | ST 62.5<br>BD 33<br>β-HEA 1 | ST 62.5<br>BD 33<br>β-HEA 1 | ST 62.5<br>BD 33<br>β-HEA 1 | ST 62.5<br>BD 33<br>β-HEA 1 |
|  | Monomer X | Type | IA | IA | IA | IA |
|  |  | Amount (parts) | 3.5 | 3.5 | 3.5 | 3.5 |
| Water-soluble polymer | Monomer I | Type | AAm | AAm | AAm | AAm |
|  |  | Amount (parts) | 0.80 | 0.80 | 0.80 | 0.80 |

TABLE 3-continued

[Results of Examples 9 to 12]

|  |  |  | Ex. 9 | Ex. 10 | Ex. 11 | Ex. 12 |
|---|---|---|---|---|---|---|
|  | Monomer II | Type | MAA | MAA | MAA | MAA |
|  |  | Amount (parts) | 32.5 | 32.5 | 32.5 | 32.5 |
|  | Monomer III | Type | TFEMA | TFEMA | TFEMA | TFEMA |
|  |  | Amount (parts) | 7.5 | 7.5 | 7.5 | 7.5 |
|  | Monomer IV | Type | GMA | EGDMA | EDMA | EDMA |
|  |  | Amount (parts) | 0.8 | 0.8 | 0.15 | 1.8 |
|  | Monomer V | Type | PD-104 | PD-104 | PD-104 | PD-104 |
|  |  | Amount (parts) | 1.2 | 1.2 | 1.2 | 1.2 |
|  | Monomer VI | Type | EA | EA | EA | EA |
|  |  | Amount (parts) | 57.2 | 57.2 | 57.85 | 56.2 |
|  | Mw |  | 89200 | 126800 | 44780 | 89800 |
|  | Particulate:water |  | 95:5 | 95:5 | 95:5 | 95:5 |
| Active material |  |  | Graphite | Graphite | Graphite | Graphite |
| CMC salt |  |  | MAC350HC | MAC350HC | MAC350HC | MAC350HC |
| Gas suppression | ΔV |  | 23% | 24% | 22% | 21% |
| Adhesion | Sp1 | (N/m) | 21.6 | 22.2 | 18.2 | 17.2 |
| Cycle property | ΔC |  | 84.80% | 83.70% | 83.20% | 84.80% |
| Corrosion suppression | Sp2 | (N/m) | 9.1 | 8.3 | 8.5 | 11.5 |

TABLE 4

[Results of Examples 13 to 16]

|  |  |  | Ex. 13 | Ex. 14 | Ex. 15 | Ex. 16 |
|---|---|---|---|---|---|---|
| Particulate polymer | Monomer | Type and amount | ST 62.5 BD 33 β-HEA 1 | ST 62.5 BD 33 β-HEA 1 | ST 62.5 BD 33 β-HEA 1 | 2-EHA 76 AN 20 |
|  | Monomer X | Type | IA | IA | IA | IA |
|  |  | Amount (parts) | 3.5 | 3.5 | 3.5 | 4.0 |
| Water-soluble polymer | Monomer I | Type | AAm | AAm | AAm | AAm |
|  |  | Amount (parts) | 0.80 | 0.80 | 0.80 | 0.80 |
|  | Monomer II | Type | MAA | MAA | MAA | MAA |
|  |  | Amount (parts) | 32.5 | 32.5 | 32.5 | 32.5 |
|  | Monomer III | Type | — | TFEMA | TFEMA | TFEMA |
|  |  | Amount (parts) | — | 7.5 | 7.5 | 7.5 |
|  | Monomer IV | Type | EDMA | EDMA | EDMA | EDMA |
|  |  | Amount (parts) | 0.8 | 0.8 | 0.8 | 0.8 |
|  | Monomer V | Type | PD-104 | PD-104 | PD-104 | PD-104 |
|  |  | Amount (parts) | 1.2 | 1.2 | 1.2 | 1.2 |
|  | Monomer VI | Type | EA | EA | EA | EA |
|  |  | Amount (parts) | 64.7 | 57.2 | 57.2 | 57.2 |
|  | Mw |  | 60200 | 58400 | 58400 | 58400 |
|  | Particulate:water |  | 95:5 | 98.5:1.5 | 72:28 | 95:5 |
| Active material |  |  | Graphite | Graphite | Graphite | LCO |
| CMC salt |  |  | MAC350HC | MAC350HC | MAC350HC | MAC350HC |
| Gas suppression | ΔV |  | 24% | 26.50% | 18.50% | 27.50% |
| Adhesion | Sp1 | (N/m) | 15.5 | 16.1 | 27.8 | 25.6 |
| Cycle property | ΔC |  | 80.90% | 84.10% | 85.50% | 84.70% |
| Corrosion suppression | Sp2 | (N/m) | 7.8 | 8.8 | 11.8 | 16.5 |

TABLE 5

[Results of Comparative Examples 1 to 5]

| | | | Comp. Ex. 1 | Comp. Ex. 2 | Comp. Ex. 3 | Comp. Ex. 4 | Comp. Ex. 5 |
|---|---|---|---|---|---|---|---|
| Particulate polymer | Monomer | Type and amount | ST 62.5 BD 33 β-HEA 1 | ST 62.5 BD 32 β-HEA 1 AAm 1 | ST 62.5 BD 33 β-HEA 1 | ST 62.5 BD 33 β-HEA 1 | ST 62.5 BD 33 β-HEA 1 |
| | Monomer X | Type | IA | IA | IA | IA | IA |
| | | Amount (parts) | 3.5 | 3.5 | 3.5 | 3.5 | 3.5 |
| Water-soluble polymer | Monomer I | Type | — | — | — | AAm | AAm |
| | | Amount (parts) | | | | 0.05 | 15 |
| | Monomer II | Type | | | MAA | MAA | MAA |
| | | Amount (parts) | | | 35 | 35 | 35 |
| | Monomer III | Type | | | — | — | — |
| | | Amount (parts) | | | | | |
| | Monomer IV | Type | | | — | — | — |
| | | Amount (parts) | | | | | |
| | Monomer V | Type | | | — | — | — |
| | | Amount (parts) | | | | | |
| | Monomer VI | Type | | | EA | EA | EA |
| | | Amount (parts) | | | 65 | 64.95 | 50 |
| | Mw | | | | 85800 | 87000 | 88500 |
| | Particulate:water | | | | 95:5 | 95:5 | 95:5 |
| Active material | | | Graphite | Graphite | Graphite | Graphite | Graphite |
| CMC salt | | | MAC350HC | MAC350HC | MAC350HC | MAC350HC | MAC350HC |
| Gas suppression | ΔV | | 55.00% | 53.50% | 68% | 43% | 54% |
| Adhesion | Sp1 | (N/m) | 10.4 | 11.2 | 12.3 | 7.2 | 8.5 |
| Cycle property | ΔC | | 76.50% | 77.90% | 70% | 73% | 71% |
| Corrosion suppression | Sp2 | (N/m) | 3.5 | 3.8 | 1.7 | 2.2 | 1.8 |

Discussion

As seen from the aforementioned Table 1 to Table 5, volume change amount ΔV of the battery cell is drastically smaller in Examples than in Comparative Examples. This demonstrated that the present invention can suppress gas generation in the lithium ion secondary battery.

Peel strength Sp1 between the pressed current collector and electrode active material is higher in Examples than in Comparative Examples. This demonstrated that the present invention can usually achieve a lithium ion secondary battery having high binding force between the current collector and the electrode active material layer. Such a high binding force between the current collector and the electrode active material layer may lead to low tendency of peeling of the electrode active material layer from the current collector, even upon occurrence of stress in electrodes due to factors such as expansion and contraction of the active materials associated with charging and discharging, and change in temperature.

For this reason, even when charging and discharging are repeated, decrease in battery capacity does not readily occur. Therefore, battery property such as cycle property can be expected to improve.

Capacity maintenance ratio ΔC of the batteries is larger in Examples than in Comparative Examples. This demonstrated that the present invention can usually provide a battery having excellent high-temperature cycle property.

Therefore, according to the present invention, it is expected to extend life of lithium ion secondary batteries.

Furthermore, peel strength Sp2 between the current collector and the electrode active material layer after cycle test is higher in Examples than in Comparative Examples. This demonstrated that the present invention can usually achieve a lithium ion secondary battery which does not easily cause decrease in the binding force between the current collector and the electrode active material layer even when charging and discharging are repeated. One of the causes of reduction in binding force between the current collector and the electrode active material layer is development of corrosion on the surface of the current collector. According to the study by the present inventor, the reason why the reduction in binding force between the current collector and the electrode active material layer is suppressed is inferred that such a development of corrosion on the surface of the current collector can be suppressed in the lithium ion secondary battery according to the present invention.

Furthermore, especially in Comparative Example 2, the particulate polymer contains a carboxylic acid amide monomer unit, but exhibits large volume change amount ΔV in the battery cell. As understood from this, the effect of suppressing gas generation with a carboxylic acid amide monomer unit is exerted only when the water-soluble polymer includes the carboxylic acid amide monomer unit in combination with the ethylenically unsaturated carboxylic acid monomer unit and the crosslinkable monomer unit.

The invention claimed is:

1. A slurry composition for a lithium ion secondary battery electrode, comprising an electrode active material, a particulate polymer, and a water-soluble polymer,
wherein the water-soluble polymer includes an ethylenically unsaturated carboxylic acid monomer unit in an amount of 20% by weight to 85% by weight, a carboxylic acid amide monomer unit in an amount of 0.1% by weight to 10% by weight, and a crosslinkable monomer unit in an amount of 0.1% by weight to 2.0% by weight, the ethylenically unsaturated carboxylic acid monomer is at least one selected from the group consisting of ethylenically unsaturated mono-carboxylic acid and ethylenically unsaturated dicarboxylic acid, the carboxylic acid amide monomer is at least one selected from the group consisting of (meth)acrylamide, N-2-dimethylaminoethyl(meth)acrylamide, and N-3-dimethylaminopropyl (meth)acrylamide, and a weight ratio between the particulate polymer and the water-soluble polymer is: particular polymer/water-soluble polymer=72/28 to 50.0/50.0.

2. The slurry composition for a lithium ion secondary battery electrode according to claim 1, wherein the water-soluble polymer has a weight average molecular weight of 5,000 to 200,000.

3. The slurry composition for lithium ion secondary battery electrodes according to claim 1, comprising a carboxymethyl cellulose salt.

4. An electrode for a lithium ion secondary battery, comprising:

a current collector; and an electrode active material layer obtained by applying, onto the current collector, the slurry composition for a lithium ion secondary battery electrode according to claim 1, and drying the slurry composition.

5. A lithium ion secondary battery comprising a positive electrode, a negative electrode, and an electrolytic solution, wherein the positive electrode, the negative electrode, or both the positive electrode and the negative electrode are the electrode for a lithium ion secondary battery according to claim 4.

* * * * *